United States Patent
Sethi et al.

(10) Patent No.: US 10,483,661 B2
(45) Date of Patent: *Nov. 19, 2019

(54) SYSTEM AND METHOD FOR SEALING ELECTRICAL TERMINALS

(71) Applicant: TE CONNECTIVITY CORPORATION, Berwyn, PA (US)

(72) Inventors: Sunny Sethi, Castro Valley, CA (US); Vijay Daga, Sunnyvale, CA (US); Kavitha Bharadwaj, Fremont, CA (US); Ting Gao, Palo Alto, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,093

(22) Filed: Jul. 17, 2018

(65) Prior Publication Data

US 2018/0323519 A1    Nov. 8, 2018

Related U.S. Application Data

(63) Continuation-in-part of application No. 15/493,342, filed on Apr. 21, 2017, and a continuation-in-part of application No. 15/426,552, filed on Feb. 7, 2017.

(51) Int. Cl.
*H01R 13/52* (2006.01)
*H01R 4/72* (2006.01)
(Continued)

(52) U.S. Cl.
CPC .......... *H01R 4/72* (2013.01); *H01R 13/5216* (2013.01); *H01R 4/185* (2013.01); *H01R 11/12* (2013.01); *H02G 15/04* (2013.01)

(58) Field of Classification Search
CPC ................................. H01R 4/72; H02G 15/04
See application file for complete search history.

(56) References Cited

U.S. PATENT DOCUMENTS 2,932,685 A    4/1960   Raila et al.
3,123,663 A    3/1964   Muldoon
(Continued)

FOREIGN PATENT DOCUMENTS

DE    3940698 C1    5/1991
EP    0 159 945 A2   10/1985
(Continued)

OTHER PUBLICATIONS

RayBlock 85, Heat-shrinkable water-blocking system, Raychem, 2002, 2 pgs.
(Continued)

*Primary Examiner* — Tho D Ta

(57) ABSTRACT

A system for sealing an electrical terminal which includes a device for sealing a plurality of electrical wires to a wire attachment portion of an electrical terminal. The device includes a shrinkable tubing which is placed over the plurality of electrical wires such that one end thereof extends over the wire attachment portion of the electrical terminal. A sealant/adhesive is placed within the heat shrink tubing and has a first portion proximate to the edge of heat shrink tubing. The sealant/adhesive has a strip of high viscosity sealant/adhesive proximate a strip of low viscosity sealant/adhesive. Upon the application of heat to the device after installation of the device over the electrical terminal, the shrinkable tubing starts to recover, the first portion of the sealant/adhesive flows and seals free ends of the plurality of electrical wires to seal the free ends of the electrical wires.

20 Claims, 14 Drawing Sheets

(51) Int. Cl.
  *H01R 4/18* (2006.01)
  *H02G 15/04* (2006.01)
  *H01R 11/12* (2006.01)

(56) References Cited

U.S. PATENT DOCUMENTS

| | | | |
|---|---|---|---|
| 4,237,609 | A | 12/1980 | Clabburn et al. |
| 4,380,686 | A | 4/1983 | Moisson |
| 4,409,430 | A | 10/1983 | Boscher et al. |
| 4,501,927 | A | 2/1985 | Sievert |
| 4,972,042 | A | 11/1990 | Seabourne et al. |
| 4,993,149 | A | 2/1991 | Zilligen et al. |
| 4,997,689 | A | 3/1991 | Langen et al. |
| 5,140,746 | A | 8/1992 | Debbaut |
| 5,143,122 | A | 9/1992 | Adkins |
| 5,143,761 | A | 9/1992 | Chiotis et al. |
| 5,378,879 | A | 1/1995 | Monovoukas |
| 5,431,758 | A | 7/1995 | Delalle |
| 5,597,620 | A | 1/1997 | Martino |
| 5,922,992 | A | 7/1999 | Kinney et al. |
| 6,079,991 | A | 6/2000 | Lemke et al. |
| 6,107,573 | A | 8/2000 | Uchiyama et al. |
| 6,139,336 | A | 10/2000 | Olson |
| 6,666,732 | B1 | 12/2003 | Endacott |
| 6,869,292 | B2 | 3/2005 | Johnescu et al. |
| 7,230,214 | B2 | 6/2007 | Kirby |
| 7,364,478 | B2 | 4/2008 | Xu |
| 7,834,268 | B2 | 11/2010 | Ootsuki |
| 7,896,712 | B2 | 3/2011 | Cecil et al. |
| 8,951,063 | B2 | 2/2015 | Iio |
| 2007/0128925 | A1 | 6/2007 | Graeve et al. |
| 2011/0177727 | A1 | 7/2011 | Zhao |
| 2016/0013596 | A1 | 1/2016 | Regnier |
| 2017/0200536 | A1 | 7/2017 | Yabe et al. |
| 2018/0097344 | A1 | 4/2018 | Daga et al. |
| 2018/0226731 | A1* | 8/2018 | Sethi ............ H01R 4/723 |

FOREIGN PATENT DOCUMENTS

| | | |
|---|---|---|
| EP | 0267028 A2 | 5/1988 |
| EP | 0270283 A2 | 6/1988 |
| EP | 0332821 A2 | 9/1989 |
| EP | 0518032 A1 | 12/1992 |
| WO | 9723924 A1 | 7/1997 |
| WO | 99/54962 A1 | 10/1999 |
| WO | 2017053944 A1 | 3/2017 |
| WO | 2018064309 A1 | 4/2018 |

OTHER PUBLICATIONS

RayBlock 85 Sealing Kit, Protection Products Harness Design, Catalog 1654296-3, Oct. 2012, 2 pgs.
RBK-RTP-125 Tubing, Protection Products Harness Design, Catalog 1654296-3, Oct. 20, 2012, 2 pgs.
Rayblock 105 Sealing Kit, Protection Products Harness Design, Catalog 1654296-3, Oct. 20, 2012, 2 pgs.
Flexible, Flame-Retardant, Dual-Color, Polyolefin Tubing, Raychem Tubing Products, DCPT, Apr. 2016, 2 pgs.
Standard Test Methods for Softening Point of Resins by Ring-and-Ball Apparatus, ASTM Designation: E28-97, 1997, pp. 678-683.
"Operating Instructions: AD-3050 Seal Test Equipment," 24 pages (2012), Available at http://www.te.com/commerce/DocumentDelivery/DDEController?Action=srchrtrv&DocNm=412-94165-1%DocType=SS&DocLang=English.
U.S. Appl. No. 15/426,552, filed Feb. 7, 2017.
U.S. Appl. No. 15/493,342, filed Apr. 21, 2017.
U.S. Appl. No. 15/957,298, filed Apr. 19, 2018.
Co-pending U.S. Appl. No. 16/046,577, filed Jul. 26, 2018.

* cited by examiner

SYSTEM AND METHOD FOR SEALING ELECTRICAL TERMINALS

CROSS-REFERENCE TO RELATED APPLICATIONS

This application is a Continuation-in-Part of U.S. patent application Ser. No. 15/493,342 filed on Apr. 21, 2017, which is Continuation-in-Part of U.S. patent application Ser. No. 15/426,552 filed on Feb. 7, 2017, and claims priority to both applications, which are herein incorporated by reference in their entirety.

BACKGROUND OF THE INVENTION

The described invention relates generally to systems and methods for sealing ring terminals and other types of terminals used in the automotive industry and other industries, and more specifically to sealing systems and methods that include heat shrink tubing and sealant systems that are used in combination with the heat shrink tubing. The heat shrink tubing systems can be single-layered systems or multi-layered systems and the sealant systems may include hot melt adhesives, butyl mastics, or other types of sealants.

Ring terminals are typically used to attach electrical wires to studs or posts (such as those found on vehicle batteries and other batteries) and are manufactured in various types and sizes. Ring terminals typically include a ring portion and a wire attachment/connection portion to which electrical wires are connected by welding or other means. Non-insulated ring terminals can be crimped or soldered and may be finished off with heat shrink tubing to insulate and protect the connection formed between the electrical wires and the wire attachment portion of the terminal. Heat shrink tubing (HST) is a shrinkable plastic tube often used to insulate electrical wires. HST provides abrasion resistance and environmental sealing protection for stranded and solid wire conductors, connections, joints, and terminals used in various electrical applications. HST can also be used to repair damaged insulation on electrical wires, bundle wires together, and to create cable entry seals. As stated above, HST may be a single-walled system or a multi-walled system, wherein the multi-walled system includes at least one heat-shrinkable layer and at least one layer of a sealant system. Heat shrink tubing is commonly manufactured from fluoropolymer or polyolefin, which shrinks radially when heated. The process of shrinking an HST is referred to as "recovering" an HST and the predetermined temperature at which a HST starts to recover is referred to as its "recovery temperature". As an HST recovers, i.e., shrinks, it exerts an inward force against the items it surrounds, which is referred to as the "hoop stress" of the HST. More specifically, hoop stress (also known as cylinder stress) is the force exerted circumferentially (perpendicular both to the axis and to the radius of the object) in both directions on every particle in the tubing or cylinder wall. The degree of hoop stress is determined by certain HST characteristics such as the type of base material, wall thickness, degree of cross-linking, and degree of expansion. Hoop stress is also affected by process parameters such as temperature of recovery and degree of recovery.

Ring terminals currently used with passenger and commercial vehicle electrical systems include single-wire and multi-wire configurations. Multi-wire configurations have created significant challenges with regard to sealing the terminal-wire interface area on such terminals. External sealant systems that include the use of heat shrink tubing and an adhesive/sealant layer have been previously used to create a water tight seal in between and outside of the electrical wires attached to the terminal. However, existing sealant systems are not capable of sealing the multiple electrical wires (e.g., six or more wires) included in multi-wire configurations in a simple and reliable manner. A first problematic situation involves the wicking of water (if present in the operating environment); water can wick from the ring portion of the terminal onto the wire attachment portion of the terminal, then onto the attached electrical wires, and then from one end of the electrical wires to the other end thereof through the welded or crimped interface; water can also wick from in between the wires and into the terminal. A second problematic issue involves the flow or oozing of excessive adhesive or sealant onto the ring portion of the ring terminal. Adhesive that is present on the ring portion can interfere with the metal to metal contact that is needed for an effective electrical contact.

To overcome the limitations of sealing systems that involve the use of external adhesive and heat shrink tubing, the industrial approach currently used involves a multi-component, multi-step process. This process is labor intensive and expensive; therefore, there is an ongoing need for a sealing system for use with ring terminals that meets all functional requirements in a simplistic, reliable, and cost-effective manner.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first system for sealing an electrical terminal is provided. This system includes a device for sealing a plurality of electrical wires to a wire attachment portion of an electrical terminal, wherein the device further includes a first piece of shrinkable tubing having a predetermined length, wherein the first piece of shrinkable tubing has been placed over the plurality of electrical wires such that one end thereof extends over the wire attachment portion of the electrical terminal; a second piece of shrinkable tubing having a predetermined length, wherein the second piece of heat shrinkable tubing is a double-walled system that includes an outer layer and an inner layer, and wherein the inner layer includes a high-viscosity adhesive, wherein the second piece of shrinkable tubing has a smaller diameter than the first piece of shrinkable tubing, and wherein the second piece of shrinkable tubing is placed completely inside the end of the first piece of shrinkable tubing that extends over the wire attachment portion of the electrical terminal; and a profile of low-viscosity adhesive placed within the first piece of heat shrink tubing adjacent to the second piece of heat shrink tubing. Upon the application of heat to the device, the low-viscosity adhesive flows across and through the plurality of electrical wires, and the first and second pieces of shrinkable tubing shrink to encapsulate the electrical wires and the wire attachment portion of the ring terminal and seal the low-viscosity adhesive substantially within the first piece of shrinkable tubing.

In accordance with another aspect of the present invention, a second system for sealing an electrical terminal is provided. This system includes a device for sealing a plurality of electrical wires to a wire attachment portion of an electrical terminal, wherein the device further includes a first piece of heat shrink tubing having a predetermined length, wherein the first piece of heat shrink tubing has been placed over the plurality of electrical wires such that one end thereof extends over the wire attachment portion of the electrical terminal; a second piece of heat shrink tubing having a predetermined length, wherein the second piece of heat shrink tubing has a smaller diameter than the first piece of heat shrink tubing, and wherein the second piece of heat shrink tubing is placed partially inside the end of the first piece of heat shrink tubing that extends over the wire attachment portion of the electrical terminal; and a profile of adhesive placed within the first piece of heat shrink tubing adjacent to the second piece of heat shrink tubing. Upon the application of heat to the device, the strip of adhesive melts and flows across and through the plurality of electrical wires and the first and second pieces of heat shrink tubing shrink to encapsulate the electrical wires and the wire attachment portion of the electrical terminal and seal the melted adhesive substantially within the first piece of shrinkable tubing.

In accordance with yet another aspect of the present invention, a third system for sealing an electrical terminal is provided. This system includes a device for sealing a plurality of electrical wires against a wire attachment portion of an electrical terminal, wherein the device further includes a first piece of heat shrink tubing having a predetermined length, wherein the first piece of heat shrink tubing has been placed over the plurality of electrical wires such that one end thereof extends over the wire attachment portion of the electrical terminal; a second piece of heat shrink tubing having a predetermined length, wherein the second piece of heat shrink tubing has a larger diameter than the first piece of heat shrink tubing, and wherein the second piece of heat shrink tubing is placed outside the first piece of heat shrink tubing such that it that extends over and beyond the first piece of heat shrink tubing; and a strip of adhesive placed within the first piece of heat shrink tubing. Upon the application of heat to the device, the strip of adhesive melts and flows across and through the plurality of electrical wires and the first and second pieces of heat shrink tubing shrink to encapsulate the electrical wires and the wire attachment portion of the electrical terminal and seal the melted adhesive substantially within the first piece of shrinkable tubing.

In accordance with still another aspect of the present invention, a fourth system for sealing an electrical terminal is provided. This system includes a device for sealing a plurality of electrical wires to a wire attachment portion of an electrical terminal, wherein the device further includes an outer layer, wherein the outer layer includes a piece of heat shrink tubing of a predetermined length, wherein the piece of heat shrink tubing has been placed over the plurality of electrical wires such that one end thereof extends over the wire attachment portion of the electrical terminal; an inner layer, wherein the inner layer includes a high-viscosity adhesive having a viscosity of greater than 20 Pa·s at an installation temperature which correlates to a designated or rated temperature and a pre-recovery thickness of greater than 0.25 mm; and a strip of low-viscosity adhesive disposed within the inner layer, wherein the strip of low-viscosity adhesive has a viscosity of less than 20 Pa·s at the installation temperature which correlates to the designated or rated temperature. Upon the application of heat to the device, the low-viscosity adhesive flows across and through the electrical wires to encapsulate the electrical wires and the wire attachment portion of the electrical terminal, the edges of the heat shrink tubing recover, and the high-viscosity adhesive binds to the electrical wires to form a seal that substantially contains the low-viscosity adhesive within the heat shrink tubing.

In accordance with still another aspect of the present invention, a fifth system for sealing an electrical terminal is provided. The system includes a device for sealing a plurality of electrical wires to a wire attachment portion of an electrical terminal. The device includes a shrinkable tubing, a strip of a high viscosity sealant/adhesive, and a strip of a low viscosity sealant/adhesive. The shrinkable tubing has a predetermined length. The shrinkable tubing is placed over the plurality of electrical wires such that one end thereof extends over the wire attachment portion of the electrical terminal. The strip of the high viscosity sealant/adhesive is placed within the heat shrink tubing adjacent to the edge of heat shrink tubing. The strip of the low viscosity sealant/adhesive is placed within the heat shrink tubing and adjacent to the high viscosity sealant/adhesive such that low viscosity sealant/adhesive is further away from an edge of the shrinkable tubing. Upon the application of heat to the device, the shrinkable tubing starts to recover, the high viscosity sealant/adhesive seals the edge of the shrinkable tubing and the low-viscosity sealant/adhesive flows across and through the plurality of electrical wires to create a seal. The high viscosity sealant/adhesive prevents flow of the low-viscosity sealant/adhesive from contaminating the electrical terminal.

In accordance with still another aspect of the present invention, a sixth system for sealing an electrical terminal is provided. The system includes a device for sealing a plurality of electrical wires to a wire attachment portion of an electrical terminal. The device includes a shrinkable tubing, a high viscosity sealant/adhesive sleeve and a low viscosity sealant/adhesive sleeve. The shrinkable tubing has a predetermined length and is placed over the plurality of electrical wires such that one end thereof extends over the wire attachment portion of the electrical terminal. The high viscosity sealant/adhesive sleeve has a high viscosity sealant/adhesive. The high viscosity sealant/adhesive sleeve is positioned proximate to an edge of the shrinkable tubing. The low viscosity sealant/adhesive sleeve has a low viscosity sealant/adhesive. The low viscosity sealant/adhesive sleeve is positioned further away from the edge of the shrinkable tubing than the high viscosity sealant/adhesive sleeve. Upon the application of heat to the device, the high viscosity sealant/adhesive melts and flows forming a barrier, the low viscosity sealant/adhesive melts and flows across the plurality of wires filling any present air voids. The shrinkable tubing encapsulates the plurality of electrical wires, substantially sealing the melted low viscosity sealant/adhesive and the high viscosity sealant/adhesive in the shrinkable tubing.

In accordance with still another aspect of the present invention, a seventh system for sealing an electrical terminal is provided. The system includes a device for sealing a plurality of electrical wires to a wire attachment portion of an electrical terminal. The device includes a shrinkable tubing, a strip of a high viscosity sealant/adhesive, a strip of a low viscosity sealant/adhesive. The shrinkable tubing has a predetermined length and is placed over the plurality of electrical wires such that one end thereof extends over the wire attachment portion of the electrical terminal. The strip of a high viscosity sealant/adhesive is placed within the heat shrink tubing, with the strip of a high viscosity sealant/adhesive having a first portion proximate to the edge of heat shrink tubing. The strip of a low viscosity sealant/adhesive is placed within the heat shrink tubing and is proximate to the high viscosity sealant/adhesive such that low viscosity sealant/adhesive is further away from an edge of the shrinkable tubing. Upon the application of heat to the device after installation of the device over the electrical terminal, the shrinkable tubing starts to recover, the high viscosity sealant/adhesive seals the edge of the shrinkable tubing with the first portion cooperating with free ends of the plurality of electrical wires to seal the free ends of the electrical wires and the low-viscosity sealant/adhesive flows across and through the plurality of electrical wires creating a seal. The high viscosity sealant/adhesive prevents flow of the low-viscosity sealant/adhesive from contaminating the electrical terminal.

An embodiment is directed to a system for sealing an electrical terminal. The system includes a device for sealing a plurality of electrical wires to a wire attachment portion of an electrical terminal. The device includes a shrinkable tubing having a predetermined length, wherein the shrinkable tubing has been placed over the plurality of electrical wires such that one end thereof extends over the wire attachment portion of the electrical terminal. A sealant/adhesive is placed within the heat shrink tubing and has a first portion proximate to the edge of heat shrink tubing. The sealant/adhesive has a strip of high viscosity sealant/adhesive proximate a strip of low viscosity sealant/adhesive. Upon the application of heat to the device after installation of the device over the electrical terminal, the shrinkable tubing starts to recover, the first portion of the sealant/adhesive interacts with free ends of the plurality of electrical wires to seal the free ends of the electrical wires.

An embodiment is directed to a system for sealing an electrical terminal. The system includes a device for sealing a plurality of electrical wires to a wire attachment portion of an electrical terminal. The device includes a first strip of low viscosity sealant/adhesive positioned proximate free ends of the plurality of electrical wires, a strip of high viscosity sealant/adhesive adjacent to the first strip of low viscosity sealant/adhesive, and a second strip of low viscosity sealant/adhesive positioned proximate to the strip of the high viscosity sealant/adhesive. The strip of the high viscosity sealant/adhesive is positioned between the first strip of low viscosity sealant/adhesive and the second strip of low viscosity sealant/adhesive. A shrinkable tubing has a predetermined length, such that the shrinkable tubing has been placed over the first strip of low viscosity sealant/adhesive, the strip of high viscosity sealant/adhesive, the second strip of low viscosity sealant/adhesive and the plurality of electrical wires such that one end of the shrinkable tubing extends over the wire attachment portion of the electrical terminal. Upon the application of heat to the device after installation of the device over the electrical terminal, the first strip of low viscosity sealant/adhesive flows and seals free ends of the plurality of electrical wires to seal the free ends of the electrical wires, the strip of high viscosity sealant/adhesive seals proximate the one end of the shrinkable tubing and the second strip of low-viscosity sealant/adhesive flows across and through the plurality of electrical wires creating a seal, wherein the strip of high viscosity sealant/adhesive prevents flow of the second strip of low-viscosity sealant/adhesive from contaminating the electrical terminal.

An embodiment is directed to a system for sealing an electrical terminal. The system includes a device for sealing a plurality of electrical wires to a wire attachment portion of an electrical terminal. The device includes a shrinkable tubing having a predetermined length, wherein the shrinkable tubing has been placed over the plurality of electrical wires such that one end thereof extends over the wire attachment portion of the electrical terminal. A strip of high viscosity sealant/adhesive is placed within the heat shrink tubing. The strip of high viscosity sealant/adhesive has a first portion proximate to the edge of heat shrink tubing. The strip of the high viscosity sealant/adhesive includes a second portion. The first portion extends further from an inside surface of the shrinkable tubing than the second portion. A strip of low viscosity sealant/adhesive is placed within the heat shrink tubing and proximate to the strip of high viscosity sealant/adhesive such that strip of low viscosity sealant/adhesive is further away from an edge of the shrinkable tubing. Spacing between the strip of the high viscosity sealant/adhesive and the strip of the low viscosity sealant/adhesive is between 0 mm and 50 mm. Upon the application of heat to the device after installation of the device over the electrical terminal, the shrinkable tubing starts to recover, the strip of high viscosity sealant/adhesive seals the edge of the shrinkable tubing with the first portion cooperating with free ends of the plurality of electrical wires to flow and seal the free ends of the electrical wires and the strip of low-viscosity sealant/adhesive flows across and through the plurality of electrical wires creating a seal, wherein the strip of high viscosity sealant/adhesive prevents flow of the strip of low-viscosity sealant/adhesive from contaminating the electrical terminal.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Figure 1:
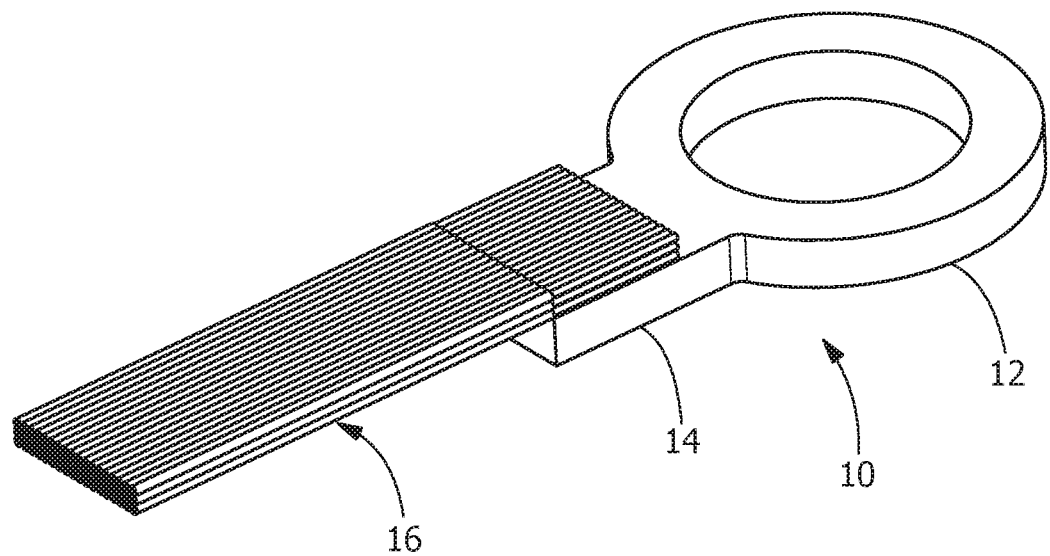
FIG. 1 is a perspective view of a ring-type electrical terminal that includes a plurality of electrical wires attached to the wire attachment portion thereof.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Exemplary embodiments of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

With reference to the Figures, FIG. 1 provides an illustration of an electrical terminal 10 that is compatible with the systems, methods, and devices of the present invention. The electrical terminal shown in FIG. 1 is a ring-type terminal; however, the systems, methods, and devices of this invention are also compatible with many other types of electrical terminals such as, for example, spade terminals, hook terminals, flag terminals, push-on terminals, and the like. With reference to FIG. 1, electrical terminal 10 includes terminal attachment portion 12 and wire attachment portion 14. Terminal attachment portion 12 is configured for connection to a complementary terminal, such as a stud or a post, of an electrical device such as, for example, a battery. Wire attachment portion 14 is configured for connection to one or more electrical wires, such as plurality of wires 16, which may be connected by welding, soldering, crimping or other suitable attachment methods.

Figure 2:
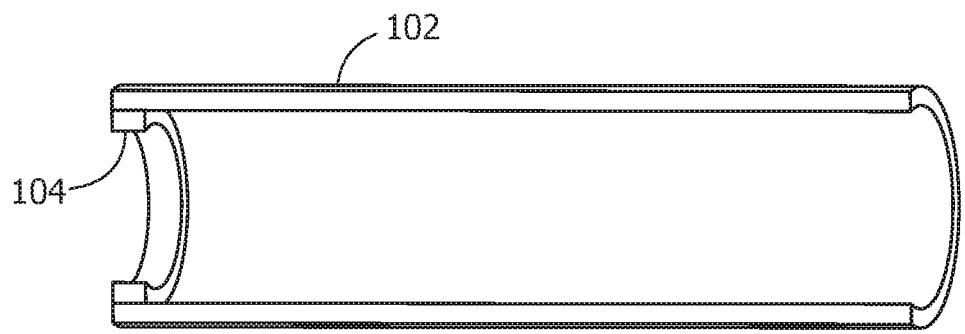
FIG. 2 is a cross-sectional side view of a piece of shrinkable tubing that includes a lip structure formed on one end thereof, in accordance with an exemplary embodiment of the present invention.
Figure 3:
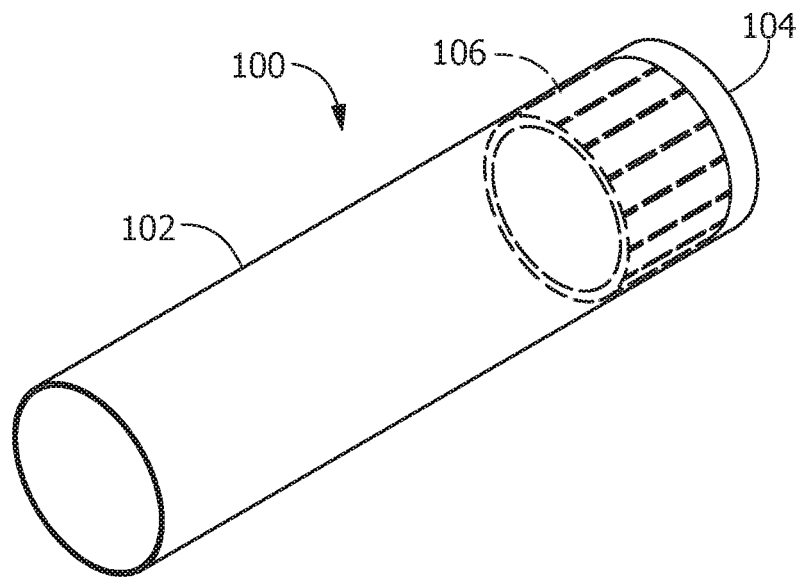
FIG. 3 is a perspective view of a device for sealing an electrical terminal in accordance with an exemplary embodiment of the present invention.
Figure 4:
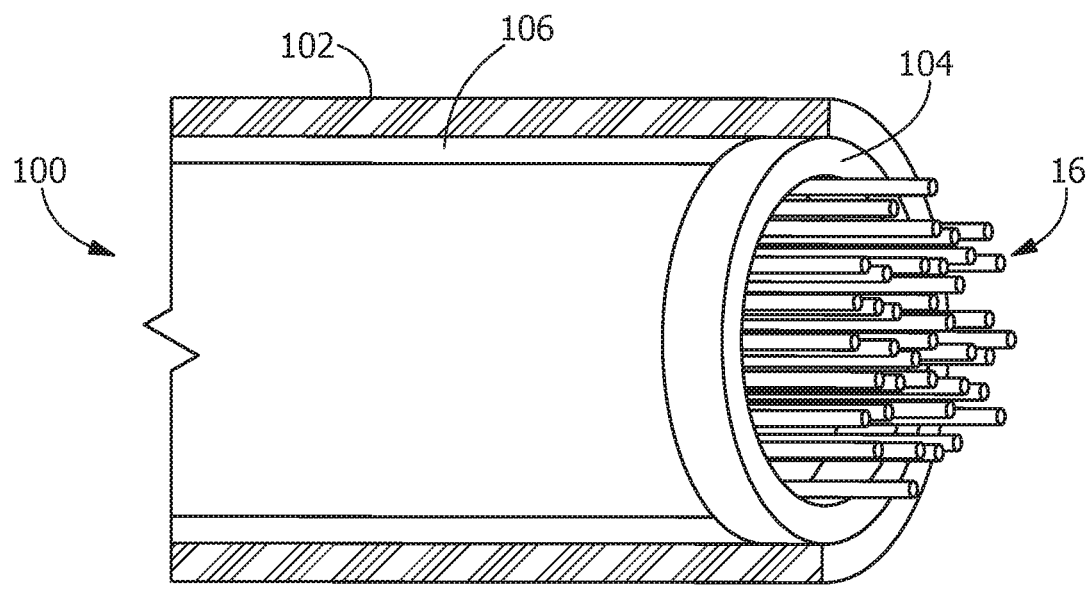
FIG. 4 is perspective cutaway view of the device of FIG. 3 after recovery of the device from a heating source, showing the complete final geometry of the seal.
Figure 5:
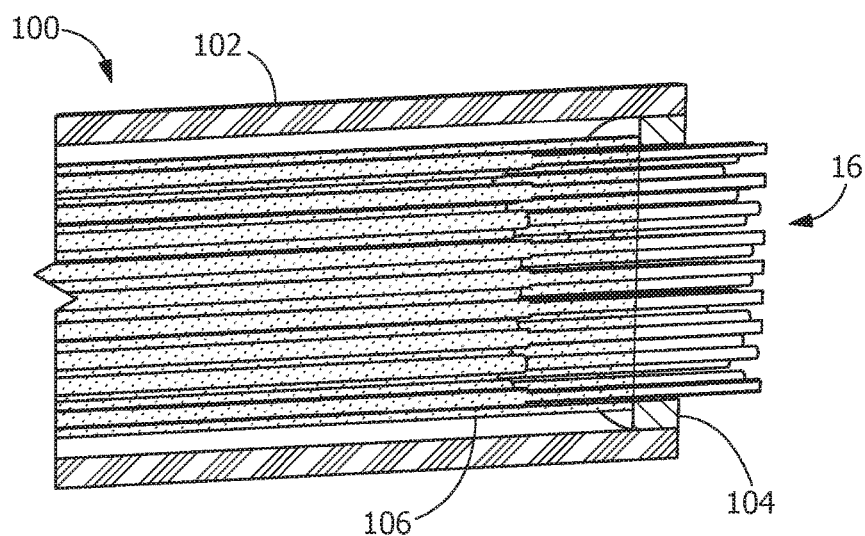
FIG. 5 is a cross-sectional side view of the device of FIG. 3 after recovery of the device from a heating source, showing the complete final geometry of the seal.

FIGS. 2-5 provide multiple illustrations of electrical terminal sealing device 100, in accordance with an exemplary embodiment of the present invention. In this embodiment, device 100 includes first piece of shrinkable tubing 102; second piece of shrinkable tubing 104; and strip of adhesive 106. As best shown in FIG. 2, second piece of shrinkable tubing 104 is used to form a lip structure, which is placed completely within one end of first piece of shrinkable tubing 102. As shown in FIG. 3, strip (e.g., a ring, sleeve, or other profiled geometry) of adhesive 106 is placed within first piece of shrinkable tubing 102 adjacent to second piece of shrinkable tubing 104. In this embodiment, first piece of shrinkable tubing 102 is typically higher-temperature shrinkable heat shrink tubing that possesses preferably a high hoop force/stress and may be a single or double walled system made from high-density polyethylene or other suitable material. Second piece of shrinkable tubing 104 may be a fast shrinking single-walled tubing or a double-walled tubing that includes a high-viscosity adhesive inner layer. Upon the application of heat (e.g., in an infrared oven for 30 seconds or other time period) to device 100, strip of adhesive 106 melts and flows across plurality of electrical wires 16 filling any present air voids. The adhesive system can also be a cross-linking system to permit high-temperature performance. First and second pieces of shrinkable tubing 102 and 104 shrink to encapsulate plurality of electrical wires 16 and wire attachment portion 14 of electrical terminal 10, thereby substantially sealing the melted adhesive within the first piece of shrinkable tubing (see FIGS. 4-5). During the heating process, the lip structure formed by second piece of shrinkable tubing 104 effectively constrains the flow of adhesive in the direction of terminal attachment portion 12, thereby reducing or preventing any problematic contamination of terminal attachment portion 12. While in some instances a small amount of adhesive may travel onto terminal attachment portion 12, the amount will be insignificant with regard to the functioning of electrical terminal 10. In some embodiments, the components of device 100 are provided individually (as opposed to pre-assembled) and are assembled on the electrical terminal and wire assembly just prior to creating the desired seal.

Figure 6:
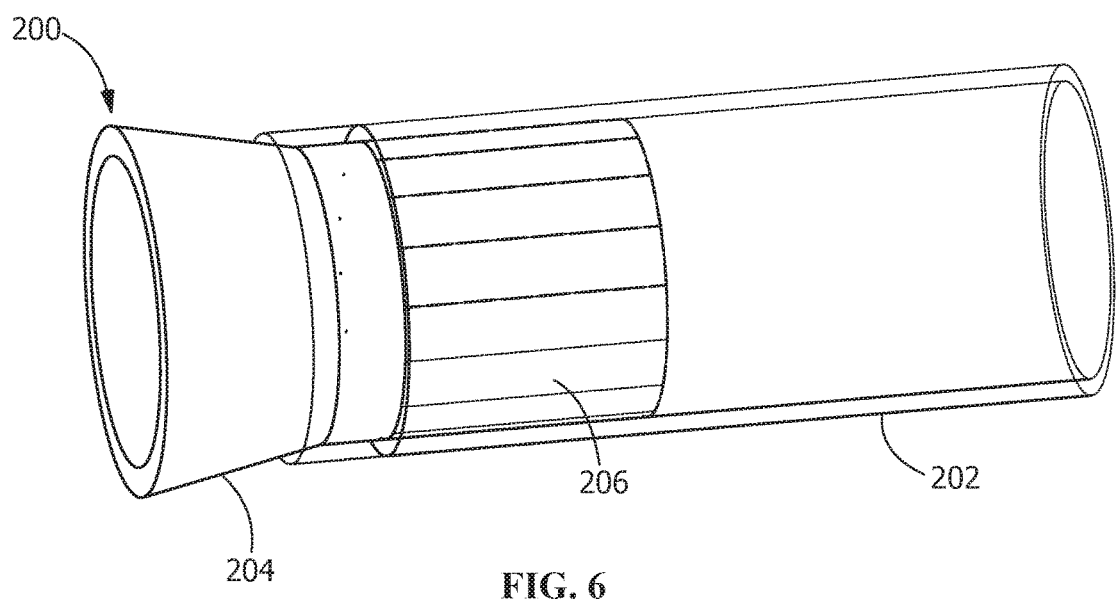
FIG. 6 is a perspective view of a device for sealing and electrical terminal in accordance with another exemplary embodiment of the present invention.
Figure 7:
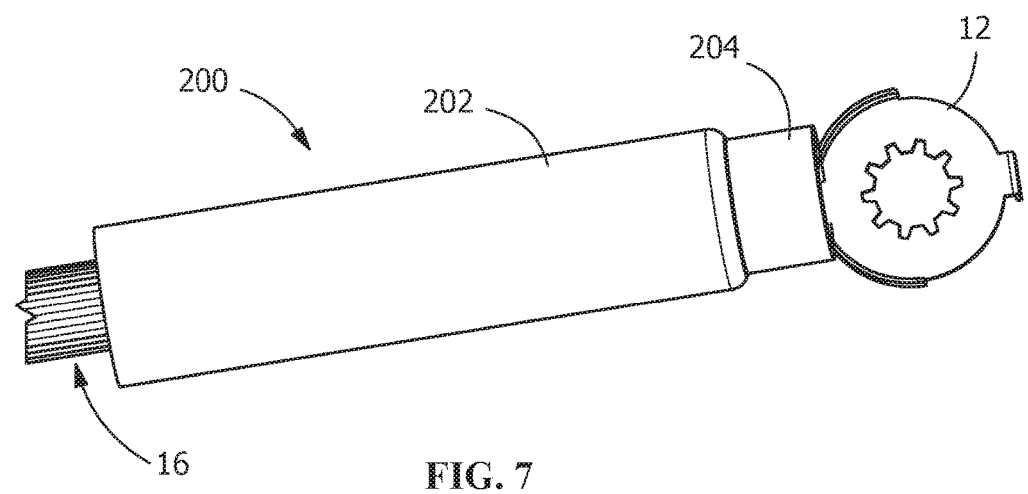
FIG. 7 is a side view of the device of FIG. 6 shown installed over a ring terminal to which electrical wires have been attached.
Figure 8:
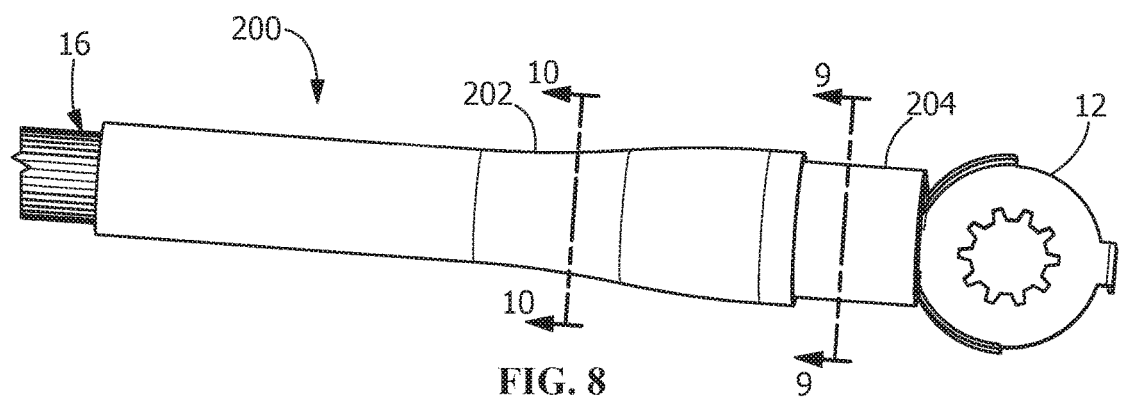
FIG. 8 is a side view of the device of FIG. 6 installed over a ring-type terminal to which electrical wires have been attached, shown after the device has been recovered from a heating source.

FIGS. 6-10 provide illustrations of electrical terminal sealing device 200, in accordance with another exemplary embodiment of the present invention. In this embodiment, device 200 includes first piece of heat shrink tubing 202; second piece of heat shrink tubing 204; and strip of adhesive/sealant 206. As best shown in FIG. 6, second piece of heat shrink tubing 204 is partially inserted into one end of first piece of heat shrink tubing 202. Strip (e.g., a ring, sleeve, or other profiled geometry) of adhesive/sealant 206 is placed within first piece of heat shrink tubing 202 in proximity to or adjacent to second piece of heat shrink tubing 204. In this embodiment, first piece of heat shrink tubing 202 is typically higher-temperature heat shrink tubing that possesses a high hoop force/stress and may be a single or double-walled system made from high-density polyethylene or other suitable heat shrinkable material. Second piece of heat shrink tubing 204 has a recovery temperature that is the same as or lower than the recovery temperature of first piece of heat shrink tubing 202 by at least 5° C. Second piece of heat shrink tubing 204 includes a thin layer of high viscosity adhesive. Upon the application of heat (e.g., in an infrared oven for 30 seconds or other time period) to device 200, strip of adhesive 206 melts and flows across plurality of electrical wires 16 filling any present air voids. The adhesive/sealant material can be chosen to have suitable flow characteristics for meeting desired temperature performance and can also be of a cross-linking type to permit high-temperature performance. First and second pieces of heat shrink tubing 202 and 204 shrink to encapsulate plurality of electrical wires 16, and wire attachment portion 14 of electrical terminal 10, thereby substantially sealing the melted adhesive within the first piece of heat shrink tubing (see FIG. 8). During the heating process, second piece of heat shrink tubing 204 effectively constrains the flow of adhesive in the direction of ring portion 12, thereby preventing any problematic contamination of terminal attachment portion 12. While in some instances a small amount of adhesive may travel onto terminal attachment portion 12, the amount will be insignificant with regard to the functioning of electrical terminal 10. In some embodiments, the components of device 200 are provided individually (as opposed to pre-assembled) and are assembled on the electrical terminal and wire assembly just prior to creating the desired seal.

Figure 9:
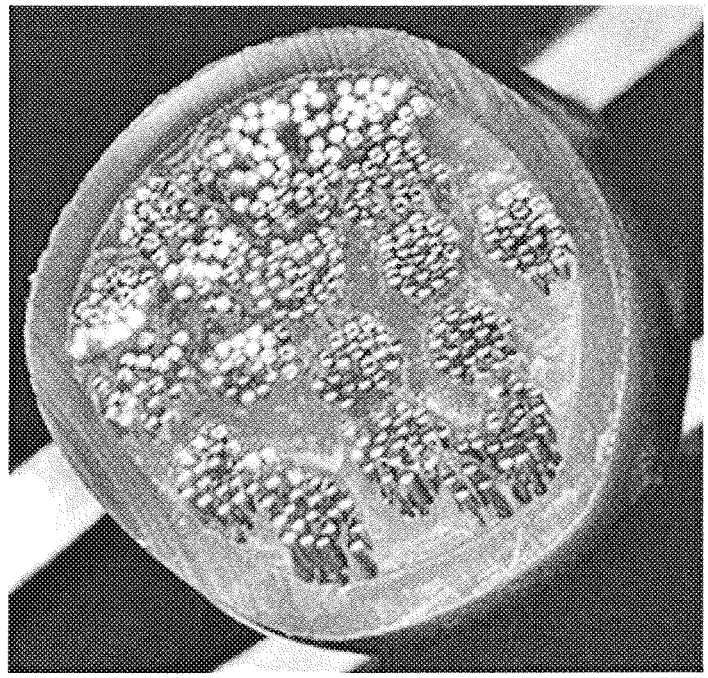
FIG. 9 is a first cross-sectional end view taken along line 9-9 of the device of FIG. 6 shown after the device has been recovered from a heating source, illustrating the even distribution of adhesive between the electrical wires.
Figure 10:
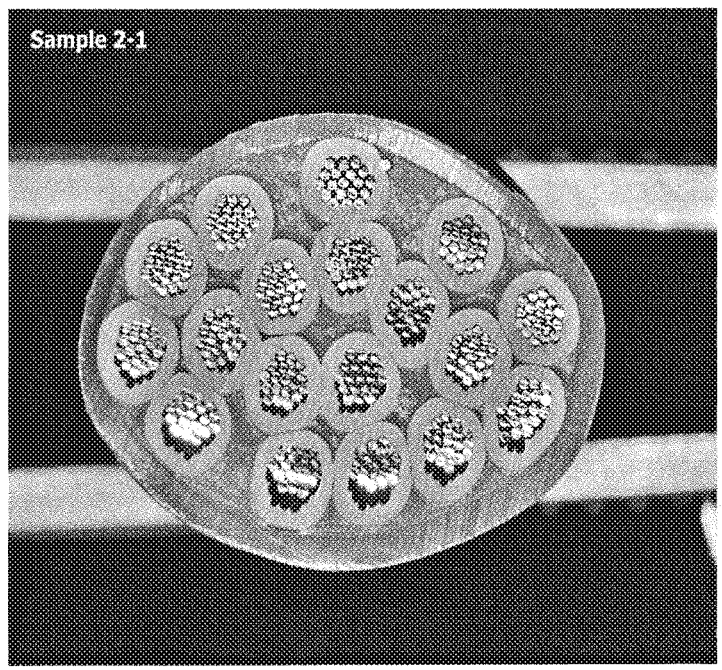
FIG. 10 is a second cross-sectional end view taken along line 10-10 of the device of FIG. 6 shown after the device has been recovered from a heating source illustrating the even distribution of adhesive between the electrical wires.

With regard to testing device 200, no adhesive was observed to have migrated onto terminal attachment portion 12 after recovery of the device from an infrared oven. Device 200 passed forced-air leak tests and adhesive drip tests wherein device 200 was kept in an oven at 125° C. for more than 24 hours. Second piece of heat shrink tubing 204 was determined to be capable of recovery in as few as 15 seconds in an infrared oven, thereby effectively creating blockage to any significant adhesive flow out of the device. FIG. 9 is a cross-sectional view, taken along line 9-9 of FIG. 6, of a wire bundle attached to a ring-type electrical terminal sealed with the device of the present invention (near the edge of the device where the insulation has been removed from the electrical wires), wherein the adhesive is shown to have adequately filled the spaces between the wires to allow passing the air leakage test. FIG. 10 is another cross-sectional view, taken along line 10-10 of FIG. 6, of a wire bundle sealed with the device of the present invention (about 1 inch away from the cross-section of FIG. 9 where the insulation around the electrical wires is intact), wherein the adhesive is again shown to have adequately filled the spaces between the wires.

The sealants/adhesives used with the present invention are designed to exhibit a low-melt viscosity so that these materials are capable of flowing between and around multiple electrical wires and providing robust sealing of an electrical terminal. The sealants/adhesives are also capable of being reheated to temperatures of up to 125° C. without running or dripping. These characteristics may be achieved through the use of high-speed cross-linking materials, high-temperature melting polymers, or a combination of both. Regarding cross-linking materials, the adhesives are capable of sufficiently cross-linking under predetermined cure conditions and upon reheating, the resultant cross-linked geometry provides seal stability. Regarding high-temperature melting polymers, the adhesives typically include a base system that melts at temperatures above 125° C. or show very little flow below 125° C. In general, the adhesive system exhibits low viscosity once molten, but maintains its form factor at temperatures below 125° C. An example of a suitable high-temperature melting adhesive is Technomelt PA 7901 (Loctite 7901 Hysol Hot Melt Adhesive; Henkel) with 0-1% CB (carbon black), which is a low viscosity polyamide used extensively for potting and encapsulating. An example of a suitable cross-linking sealant appears in TABLE 1, below. Three examples of suitable high-temperature melting systems appear in TABLES 2-4 below. The following adhesives/sealants are also compatible with this invention: hot melt thermoplastic sealants such as polyolefin-based sealants (e.g., wherein the base polymer is polyethylene (PE) metallocene-formed PE, maleic anhydride functionalized PE, glycidyl methacrylate functionalized PE, or combinations thereof); polyolefin copolymer-based sealants (e.g., wherein the base polymer is ethylene-vinyl acetate copolymer (EVA)); polyamide-based sealants; thermoplastic elastomer (TPE)-based sealants; a polyolefin and polyamide (PA) mixture-based sealant; a polyolefin and polyolefin copolymer mixture-based sealant (e.g., PE:EVA in weight ratios 95:5, 90:10, 75:25, or 50:50); a polyolefin copolymer and polyamide mixture-based sealant (e.g., EVA:PA in weight ratios of 95:5, 90:10, 75:25, or 50:50); a fluoropolymer or combinations thereof. Different sealants or sealant mixtures with similar characteristics may be also utilized with this invention. In the context of this invention, the term "sealant" includes and encompasses adhesives such as hot melt adhesives and other types of adhesives. In the context of this invention, sealant or adhesive "melt" refers to the state of a semi-crystalline polymer or material over its melting point and/or the state of an amorphous material above its softening point, as determined by tools and techniques such as a rheometer.

TABLE 1

Formulation I: Cross-Linkable Adhesive

| Chemical Description | Wt % |
|---|---|
| Polyolefins (e.g., HDPE, ethylene vinyl acetate) | 63%-90% |
| Viscosity modifiers | 0-20% |
| Organic peroxide | 1-9% |
| Cross-linking promoters (e.g., Trimethallyl isocyanurate (TAIC) or Trimethylolpropane Trimethacrylate (TMPTMA)) | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

TABLE 2

Formulation II. High-Temperature Resistance Adhesive

| Chemical Description | Wt % |
|---|---|
| EVA/PO/Waxes | 89%-95% |
| untreated and synthetic fumed silica | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

TABLE 3

Formulation III. High-Temperature Resistance Adhesive

| Chemical Description | Wt % |
|---|---|
| Polyamide | 89%-95% |
| Fumed silica | 0-10% |
| IR absorbing pigments (e.g., carbon black) | 0-2% |
| Stabilizers and antioxidants (e.g., sterically hindered phenolic antioxidants) | 0-4% |
| Metal deactivators | 0-2% |

TABLE 4

Formulation IV: High-Temperature Resistance Adhesive

| Chemical Description | Wt % |
|---|---|
| Acrylate polymer | 89%-95% |
| Fumed silica | 0-10% |
| IR absorbing pigments (e.g., carbon black) | 0-2% |
| Stabilizers and antioxidants such as sterically hindered phenolic antioxidant | 0-4% |
| Metal deactivators | 0-2% |

In addition to the embodiments described above, other geometric variations for the terminal sealing device of the present invention are possible. In one alternate embodiment, a dual-component tape is wrapped around the wire attachment portion of the electrical terminal. This system also includes a layer of pressure-sensitive adhesive (PSA), which allows installation of the tape on an electrical terminal before heat shrink tubing is placed over electrical wires that are attached to the electrical terminal. The dual-component tape includes a non-melting profile, which may be heat-shrinkable tape that is oriented toward the terminal attachment portion of the assembly and an adhesive ring that is positioned over the wire attachment portion of the assembly. One edge of the adhesive may be low flow (high viscosity), which is attained by partially cross-linking one edge of the adhesive system or through the use of a different adhesive having a higher viscosity (e.g., greater than 500 Pa·s at 120° C.). The viscosity of the sealant/adhesive materials described herein was measured using a rotation rheometer. In this method, a small disk of sealant material (e.g., 1.5 mm-1.8 mm thick, 25 mm diameter disk) is placed between plates of the rotation rheometer and sheared (oscillatory mode) by means of a rotational motion frequency of 6.28 rad/sec. The temperature of the sealant material is gradually increased from 60° C. to 140° C. at a rate of 5° C./min and 5% strain and the complex viscosity is measured as a function of temperature.

In still another embodiment, the low-temperature heat shrinkable edge tubing (see, for example, item 204 in FIG. 6), is placed over the piece of high-temperature heat shrinkable tubing (see, for example, item 202 in FIG. 6) rather than inside the piece of high-temperature heat shrinkable tubing. In this embodiment, fast-shrinking tubing is placed on the outside of high hoop stress tubing. In certain embodiments, a piece of low-temperature heat shrinkable edge tubing is placed over both ends of the piece of high-temperature heat shrinkable tubing or, alternately, inside of both ends of the piece of high-temperature heat shrinkable tubing. In still another embodiment, the first or primary piece of shrinkable tubing is narrowed (pre-recovery) at the end closest to the terminal attachment portion of the electrical terminal and expanded at the opposite end (see FIG. 7).

In still other embodiments of this invention, the device includes only a single piece of heat shrinkable tubing, an adhesive ring, and the heat source (e.g., an infrared oven) used to shrink the tubing includes multiple heating elements, wherein a first heating element (operating at a first temperature) is placed in close proximity to the terminal attachment portion of the electrical terminal and a second heating element (operating at a second temperature lower than the temperature of first heating element), is placed at a predetermined distance away from the terminal attachment portion of the electrical terminal and further away from the tubing itself. The tubing closer to the ring portion shrinks more quickly than the tubing further away from the ring terminal due to the different temperature profile of the heating system. In still another embodiment, the device includes only a single piece of heat shrinkable tubing and is passed through a heating system (e.g., an infrared oven) on a conveyer, with the terminal attachment portion entering first, causing the tubing near the ring portion to shrink first and the following length of tubing to shrink secondarily. The speed of the conveyor can be tuned for desired recovery at the ring terminal end to prevent the adhesive from oozing out of the device.

Figure 11:
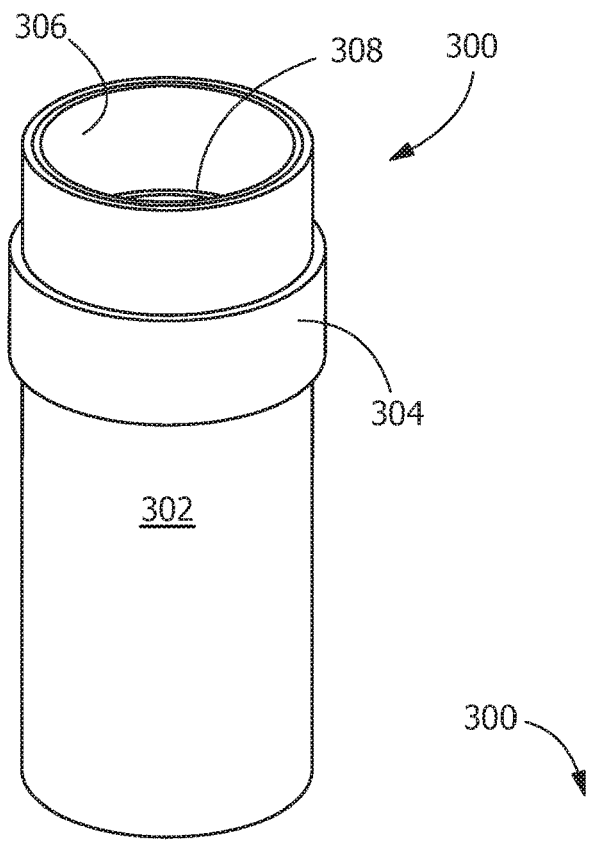
FIG. 11 is a perspective view of another exemplary embodiment of the present invention, wherein the device for sealing an electrical terminal includes an outer layer of a fast recovery heat shrinkable tubing; a high hoop stress heat shrinkable tubing that is placed on the exterior of the outer layer; an inner layer that includes a high viscosity adhesive liner; and a low viscosity adhesive ring, which is disposed within the inner layer, shown prior to recovery of the heat shrinkable tubing components thereof.
Figure 12:
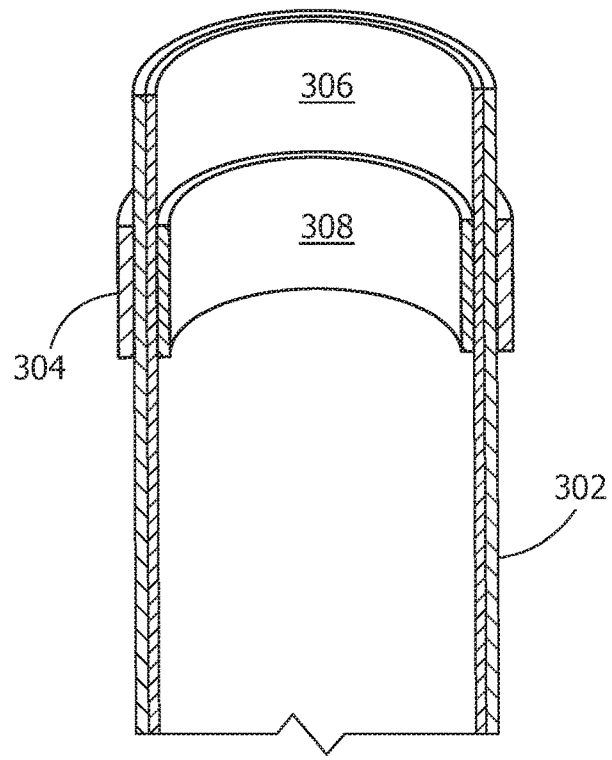
FIG. 12 is a cross-sectional perspective view of the device of FIG. 11, shown prior to recovery of the heat shrinkable tubing components thereof.

With reference to FIGS. 11-12, in yet another exemplary embodiment of this invention, device 300 includes outer layer 302, which includes a fast recovery heat shrinkable tubing; high hoop stress heat shrinkable tubing 304, which has a larger diameter than outer layer 302, a higher recovery temperature than the fast recovery heat shrinkable tubing of outer layer 302, and that is placed on the exterior of outer layer 302 (see FIG. 11); inner layer 306, which includes a high viscosity adhesive liner; and low viscosity adhesive ring 308, which is disposed within inner layer 306. When heat is applied to device 300 and the recovery temperature of the fast recovery heat shrinkable tubing of outer layer 302 is reached, outer layer 302 shrinks and forms an obstruction to the flow of the adhesive in low viscosity adhesive ring 308. As the temperature is further increased, high hoop stress heat shrinkable tubing 304 begins to recover and low viscosity adhesive ring 308 begins to melt. High hoop stress heat shrinkable tubing 304 pushes the adhesive inward, displacing air and creating a seal between wires attached to an electrical terminal and the portion of the terminal to which the wires are attached.

With reference to FIGS. 13-16, in still another exemplary embodiment of this invention, device 400 is a multi-walled tubing system that is constructed in a manner such that outer jacket or outer layer 402 includes a heat shrink tubing and inner layer 404 includes a high-viscosity adhesive core (e.g., greater than 20 Pa·s at an installation temperature which correlates to a designated or rated temperature).

Temperature rating or rated temperature of the sealant/adhesive is specified based on intended maximum use temperature. After application, adhesive should not flow out at or below their specified rated temperature. For example, for a 105° C.-rated product, the high-viscosity adhesive and the low-viscosity adhesive should have no flow at temperatures less than or equal to 105° C. Similarly, for 125° C.-rated material, the high-viscosity adhesive and the low-viscosity adhesive should have no flow at temperatures less than or equal to 125° C.

Installation temperature is defined as the temperature at which the adhesive is heated upto so that it can melt and flow in between wires. The viscosity of the material should be relatively low at installation temperatures to allow the adhesive to flow in between wires and to displace any trapped air. In general, installation temperature of the adhesive/sealant is at least 10° C. higher than the temperature rating of the structure. So, for example, if the temperature rating were to be about 105° C., during installation process the sealant installation temperature is recommended to be >115° C. This is important to ensure a robust seal.

For the given geometries, low viscosity adhesives are systems that have specified low viscosities at the installation temperature and high viscosity adhesives are systems that have specified high viscosities at the installation temperatures.

Figure 13:
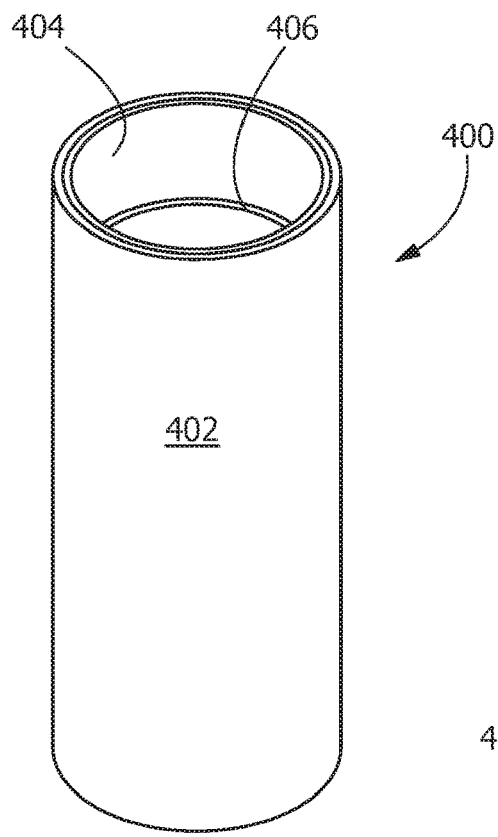
FIG. 13 is perspective view of another exemplary embodiment of the present invention, wherein the device for sealing an electrical terminal includes an outer layer of heat shrinkable tubing, an inner layer that includes a high-viscosity adhesive core, and a ring of low-viscosity adhesive disposed within the high-viscosity adhesive core, shown prior to recovery of the outer layer of heat shrinkable tubing.
Figure 14:
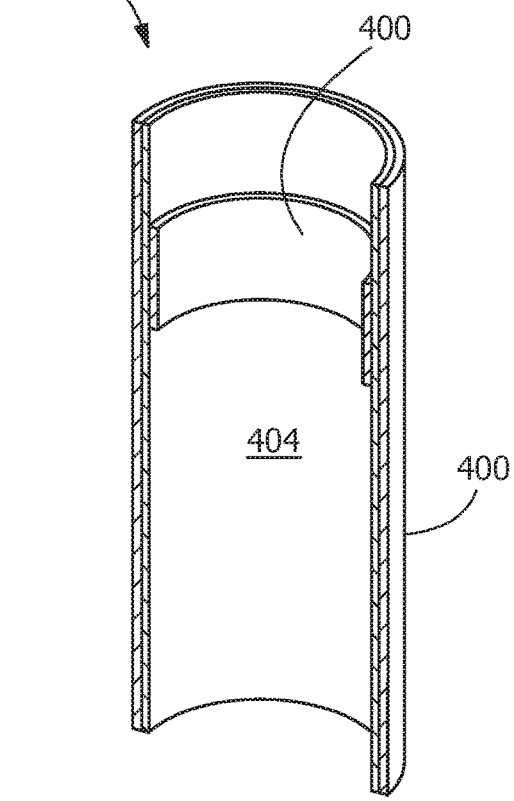
FIG. 14 is a cross-sectional perspective view of the embodiment of FIG. 14, shown prior to recovery of the outer layer of heat shrinkable tubing.
Figure 15A:
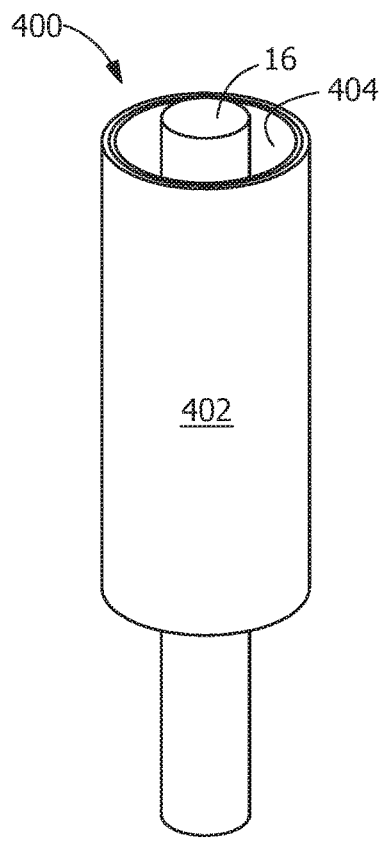
FIG. 15a is a perspective view of the embodiment of FIG. 13 placed over a wire bundle, shown prior to recovery of the outer layer of heat shrinkable tubing.
Figure 15B:
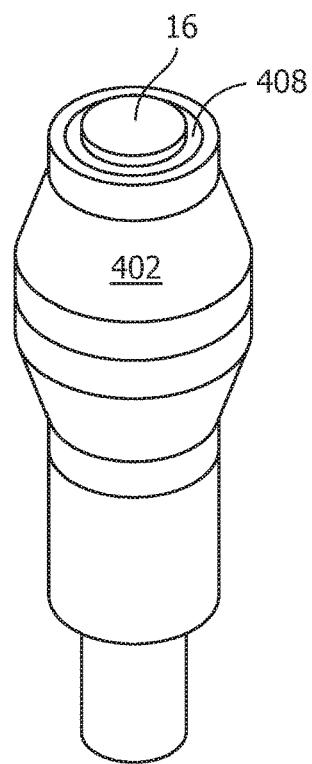
FIG. 15b is a perspective view of the embodiment of FIG. 13 placed over a wire bundle, shown after partial recovery of the outer layer of heat shrinkable tubing.
Figure 16:
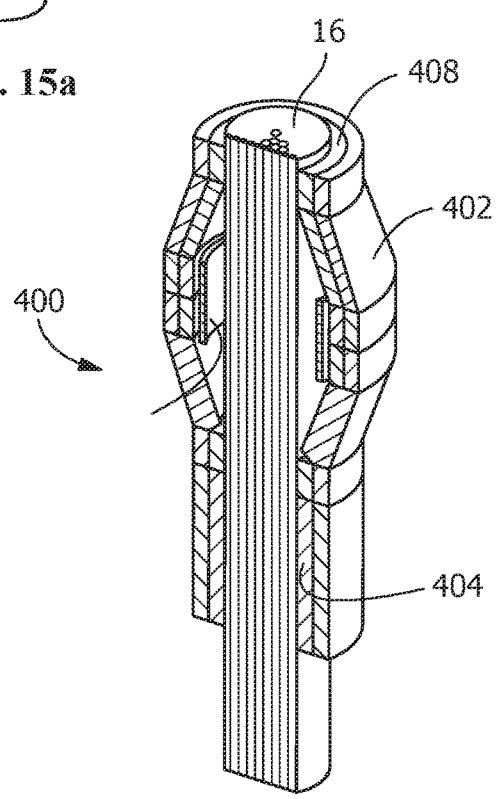
FIG. 16 is a cross-sectional perspective view of the embodiment of FIG. 13 placed over a wire bundle, shown after partial recovery of the outer layer of heat shrinkable tubing.

The viscosity of the high-viscosity adhesive permits this adhesive to sufficiently flow and create an intimate bond with rough surfaces such as the surface of soldered metal wires 16. However, the viscosity is still high enough to prevent or at least minimize any oozing out of the low viscosity sealant/adhesive included in low-viscosity adhesive strip 406, which is typically placed at a distance of about 0.25 to about 1.00 inches from the front edge of outer layer 402. With the application of heat, the edges of outer layer 402 recover and the high-viscosity adhesive core of inner layer 404 creates a barrier that prevents or minimizes any oozing out of the low-viscosity adhesive/sealant. The constrained geometry of recovered outer layer 402 forces the low-viscosity adhesive/sealant to flow in between wires 16 and creates a highly-effective water-tight seal. The synergistic effect of recovered outer jacket 402 and the high-viscosity adhesive core creates a barrier that prevents or at least minimizes the oozing out of adhesive onto an electrical terminal. FIG. 13 provides a perspective view of the exterior of this embodiment of the present invention prior to recovery and FIG. 14 provides a cross-sectional view of this embodiment prior to recovery. FIGS. 15a-b provide a perspective view of this embodiment wherein device 400 has been placed over a bundle of electrical wires (pre-recovery and post-recovery), and FIG. 16 is an illustration of this embodiment, wherein the heat shrink tubing has been partially recovered and the high-viscosity inner core has formed edge seal 408. FIG. 16 provides a cross-sectional view of the partially recovered system of FIG. 15.

Figure 17:
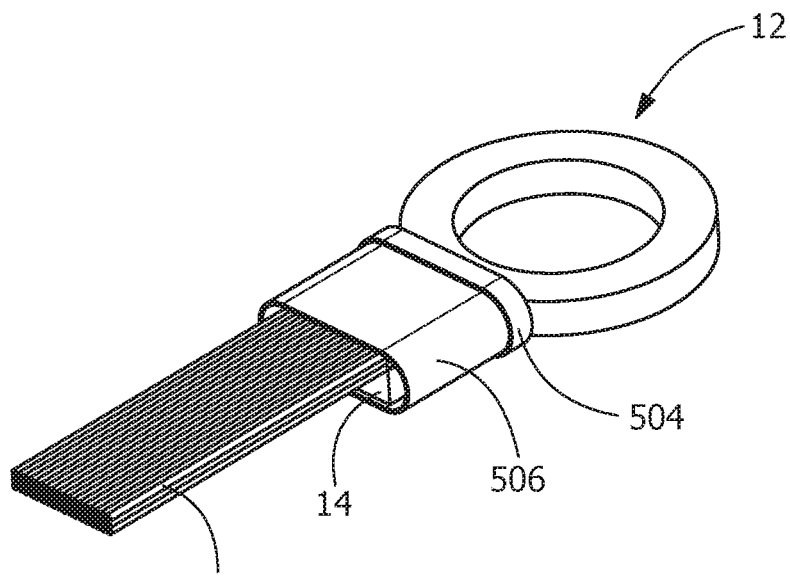
FIG. 17 is a perspective view of another exemplary embodiment of the present invention, illustrating a ring-type electrical terminal, similar to that shown in FIG. 1, with a high viscosity adhesive sleeve and a low viscosity adhesive sleeve positioned thereon.
Figure 18:
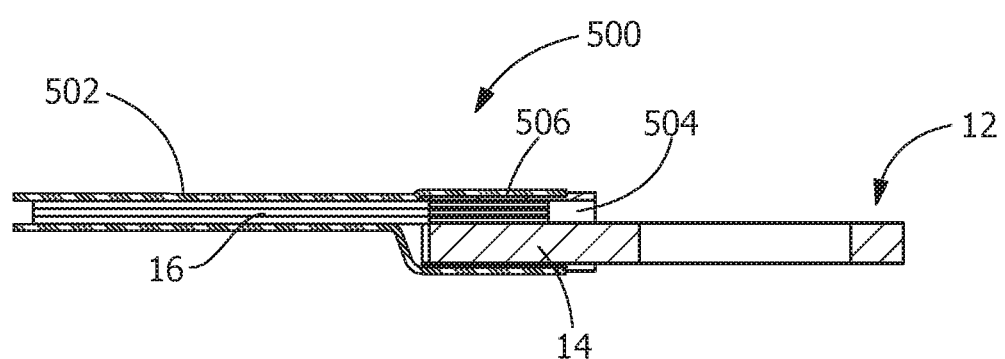
FIG. 18 is a cross-sectional side view of the embodiment of FIG. 17 with a heat shrinkable tubing positioned over the sleeves and after recovery from a heating source.

With reference to FIGS. 17-18, in still another exemplary embodiment of the invention, device 500 includes a piece of shrinkable tubing 502; a high viscosity sealant/adhesive sleeve 504; and a low viscosity sealant/adhesive sleeve 506. The shrinkable tubing 502 can be a single layer or multilayer tubing, as previously described. Also as previously described, the shrinkable tubing 502 is a polymeric component that shrinks on the application of heat. Such shrinkable tubing may include, but is not limited to, heat shrinkable tubing or tape. The term sealant/adhesive includes, but is not limited to, sealants and adhesives which are viscoelastic materials that have an ability to flow under suitable stimulus like temperature and/or pressure. Examples of such materials are hot melt adhesives and butyl mastics. The high viscosity sealant/adhesive sleeve 504 is positioned over the wire attachment portion 14 and the ends of the wires 16 and is positioned adjacent to or proximate to an edge of the heat shrink tubing 502. The high viscosity sealant/adhesive sleeve 504 includes a high viscosity sealant/adhesive. In one illustrative embodiment, the high-viscosity sealant/adhesive has a viscosity that is greater than 20 Pa·s at an installation temperature which correlates to a designated or rated temperature, as previously described. The low viscosity sealant/adhesive sleeve 506 is spaced from the ends of the wires and is adjacent to, proximate to or spaced from the high viscosity sealant/adhesive sleeve 504. The low viscosity sealant/adhesive sleeve 506 includes a low viscosity sealant/adhesive, as previously described. The spacing or distance between the high viscosity sealant/adhesive sleeve 504 and the low viscosity sealant/adhesive sleeve 506 is application dependent and may range between 0 mm and 50 mm.

The high viscosity sealant/adhesive on the high viscosity sealant/adhesive sleeve 504 has a flow behavior such that it conforms to the surface of the wire attachment portion and the surface of the plurality of wires without significantly flowing out of the desired region. This is achieved by using a sealant/adhesive which has a high inherent viscosity or which could attain high viscosity by methods like cross-linking (where the cross-linking induces viscosity increase at a higher rate than an ooze out rate). Ooze out refers to a phenomenon wherein excess sealant/adhesive flows out of the sealing zone onto the electrical terminal, thus contaminating the electrical terminal. The high viscosity sealant/adhesive sleeve 504 creates a barrier and prevents ooze out of the low viscosity sealant/adhesive of the low viscosity sealant/adhesive sleeve 506. The low viscosity sealant/adhesive of the low viscosity sealant/adhesive sleeve 506 has a low viscosity which allows it to displace air efficiently inside the substrate intended to be sealed. The low viscosity sealant/adhesive sleeve 506 creates a robust seal. A robust seal includes seals which provide an impermeable barrier between two environments. In the current case, robust sealing deters fluid flow across the barrier.

Upon the application of heat (e.g., in an infrared oven for 30 seconds or other time period) the high viscosity sealant/adhesive 504 melts and flows across the wire attachment portion 14 and surface of the plurality of wires 16 to form the barrier. The low viscosity sealant/adhesive 506 melts and flows across the plurality of wires 16 filling any present air voids. The shrinkable tubing 502 shrink to encapsulate plurality of electrical wires and wire attachment portion of the electrical terminal, thereby substantially sealing the melted sealant/adhesive within the shrinkable tubing 502. During the heating process, the high viscosity sealant/adhesive sleeve 504 effectively constrains the flow of sealant/adhesive in the direction of the terminal attachment portion 12, thereby reducing or preventing any problematic contamination of the terminal attachment portion 12. While in some instances a small amount of sealant/adhesive may travel onto terminal attachment portion 12, the amount will be insignificant with regard to the functioning of the electrical terminal. In some embodiments, the components of device 500 are provided individually (as opposed to pre-assembled) and are assembled on the electrical terminal and wire assembly just prior to creating the desired seal. For example, the piece of shrinkable tubing 502, the high viscosity sealant/adhesive sleeve 504, and the low viscosity sealant/adhesive sleeve 506 may be installed in situ. The sleeves 504, 506 may be, but are not limited to slit sealant/adhesive sleeves. While the sleeves are shown positioned proximate the wire attachment portion, the sleeves may be positioned at any desired location.

Figure 19:
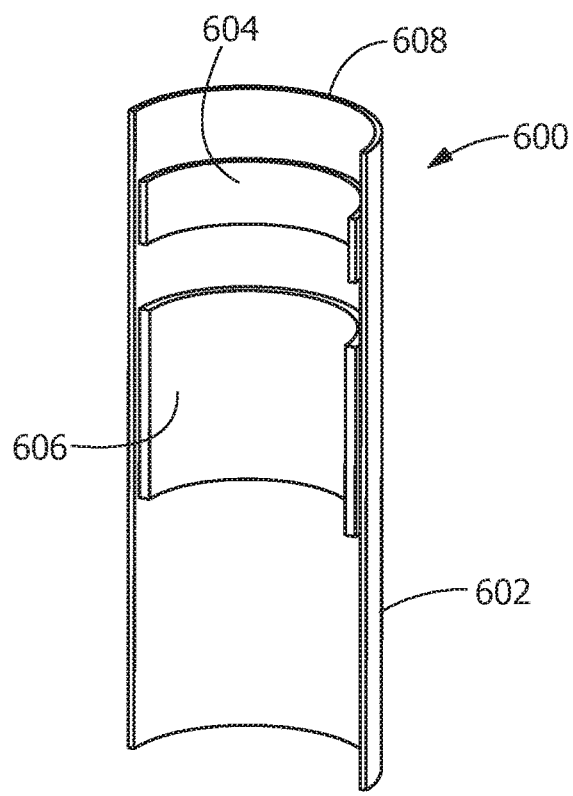
FIG. 19 is a perspective cross-section view of another exemplary embodiment of the present invention, illustrating a heat shrinkable tubing with a high viscosity adhesive profile or strip and a low viscosity adhesive profile or strip positioned thereon.

With reference to FIG. 19, in still another exemplary embodiment of the invention, device 600 includes a piece of shrinkable tubing 602; a strip (e.g., a ring, sleeve, full circular profile, semi-circular profile, or other profiled geometry) of a first sealant/adhesive 604; and a strip (e.g., a ring, sleeve, full circular profile, semi-circular profile, or other profiled geometry) of a second sealant/adhesive 606. The shrinkable tubing 602 can be a single layer or multilayer tubing, as previously described. Also as previously described, shrinkable tubing 602 is a polymeric component that shrinks on the application of heat. Such shrinkable tubing may include, but is not limited to, heat shrinkable tubing or tape. The term sealant/adhesive includes, but is not limited to, sealants and adhesives which are viscoelastic materials that have an ability to flow under suitable stimulus like temperature and/or pressure. Examples of such materials are hot melt adhesives and butyl mastics. The strip of the first sealant/adhesive 604 is placed within the shrinkable tubing 602 adjacent to or proximate an edge 608 of the shrinkable tubing 602. The first sealant/adhesive is a high viscosity sealant/adhesive. In one illustrative embodiment, the high-viscosity sealant/adhesive has a viscosity that is greater than 20 Pa·s at an installation temperature which correlates to a designated or rated temperature, as previously described. The strip of the second sealant/adhesive 606 is placed within the shrinkable tubing 602. The strip of the second sealant/adhesive 606 is spaced from the edge 608 and is spaced from the strip of the first sealant/adhesive 604. The spacing or distance between the strip of the first sealant/adhesive 604 and the strip of the second sealant/adhesive 606 is application dependent and may range between 0 mm and 50 mm. The second sealant/adhesive is a low viscosity sealant/adhesive, as previously described.

The strip of the first sealant/adhesive 604 has a flow behavior such that it conforms to the surface of the wire attachment portion or surface of the plurality of wires without significantly flowing out of the desired region. This is achieved by using a sealant/adhesive in the strip of the first sealant/adhesive 604 which has a high inherent viscosity or which could attain high viscosity by methods like cross-linking (where the cross-linking induces viscosity increase at a higher rate than an ooze out rate). The strip of the first sealant/adhesive 604 creates a barrier and prevent ooze out of the second sealant/adhesive. The strip of the second sealant/adhesive 606 has a low initial viscosity which allows it to displace air efficiently inside the substrate intended to be sealed. The strip of the second sealant/adhesive 606 creates a robust seal. The strip of the first sealant/adhesive 604 has a higher viscosity than the strip of the second sealant/adhesive 606 prior to installation.

Upon the application of heat (e.g., in an infrared oven for 30 seconds or other time period) after installation of the shrinkable tubing 602 over the electrical terminal, the strip of the first sealant/adhesive 604 melts and flows across the wire attachment portion or surface of the plurality of wires to form the barrier. In addition, the strip of the second sealant/adhesive 606 melts and flows across the plurality of wires filling any present air voids. The shrinkable tubing 602 shrinks to encapsulate the plurality of electrical wires and the wire attachment portion of the electrical terminal, thereby substantially sealing the melted sealant/adhesive within the shrinkable tubing. During the heating process, the strip of the first sealant/adhesive 604 effectively constrains the flow of sealant/adhesive in the direction of the terminal attachment portion, thereby reducing or preventing any problematic contamination of the terminal attachment portion. While in some instances a small amount of sealant/adhesive may travel onto the terminal attachment portion, the amount will be insignificant with regard to the functioning of the electrical terminal. In some embodiments, the components of device 600 are provided individually (as opposed to pre-assembled) and are assembled on the electrical terminal and wire assembly just prior to creating the desired seal.

Figure 20:
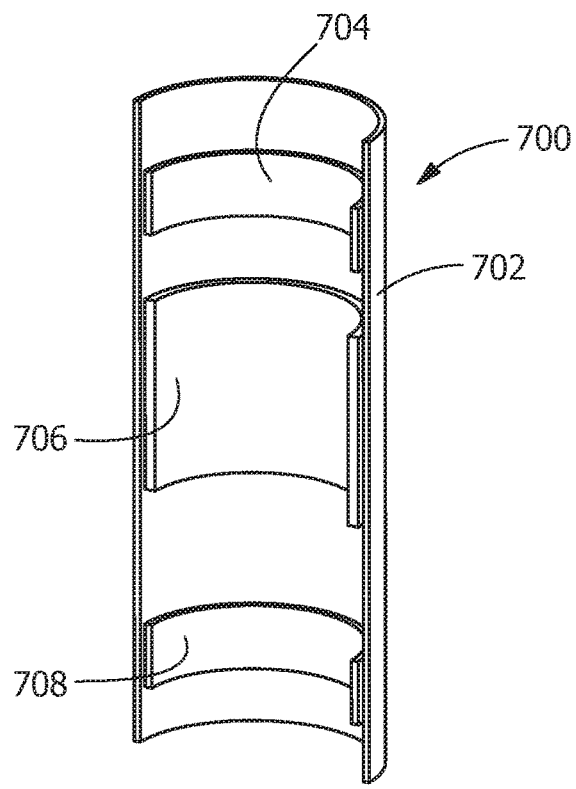
FIG. 20 is a perspective cross-section view of another exemplary embodiment of the present invention, illustrating a heat shrinkable tubing with two high viscosity adhesive profiles or bands and a low viscosity adhesive profile or band positioned thereon.

With reference to FIG. 20, in still another exemplary embodiment of the invention, device 700 includes a piece of shrinkable tubing 702; a strip (e.g., a ring, sleeve, full circular profile, semi-circular profile, or other profiled geometry) of a first sealant/adhesive 704; a strip (e.g., a ring, sleeve, full circular profile, semi-circular profile, or other profiled geometry) of a second sealant/adhesive 706: and a strip (e.g., a ring, sleeve, full circular profile, semi-circular profile, or other profiled geometry) of a third sealant/adhesive 708. The strip of the third sealant/adhesive 708 is spaced from the strip of the second sealant/adhesive 706, such that the strip of the second sealant/adhesive 706 is positioned between the strip of the first sealant/adhesive 704 and the strip of the third sealant/adhesive 708. The shrinkable tubing 702, the first strip of the first sealant/adhesive 704 and the strip of a second sealant/adhesive 706 are similar to the respective parts described above with respect to FIG. 19. In the embodiment shown, the strip of the third sealant/adhesive 708 is the same or similar to the strip of the first sealant/adhesive 704. However, the strip of the third sealant/adhesive 708 and the strip of the first sealant/adhesive 704 may be made of different materials and have different viscosities. The strip of the third sealant/adhesive 708 has a flow behavior such that it conforms to the surface of the plurality of wires without significantly flowing out of the desired region. This is achieved by using a sealant/adhesive in the strip of the third sealant/adhesive 708 which has a high inherent viscosity or which could attain high viscosity by methods like cross-linking (where the cross-linking induces viscosity increase at a higher rate than an ooze out rate). The strip of the third sealant/adhesive 708 creates a barrier and prevent ooze out of the second sealant/adhesive.

Figure 21:
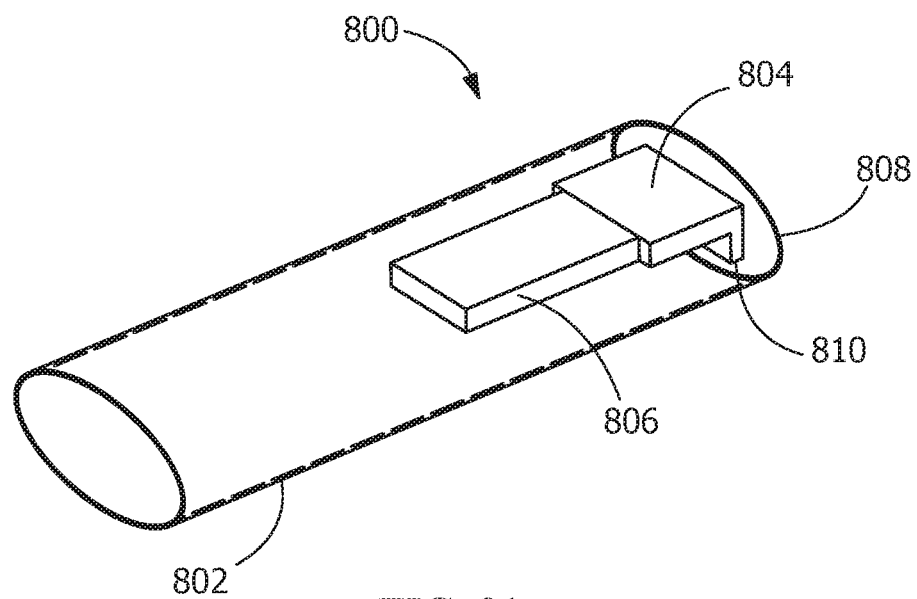
FIG. 21 is a perspective view of an alternate device for sealing an electrical terminal in accordance with an exemplary embodiment of the present invention, illustrating a heat shrinkable tubing with a high viscosity adhesive strip and a low viscosity adhesive strip positioned thereon.
Figure 22:
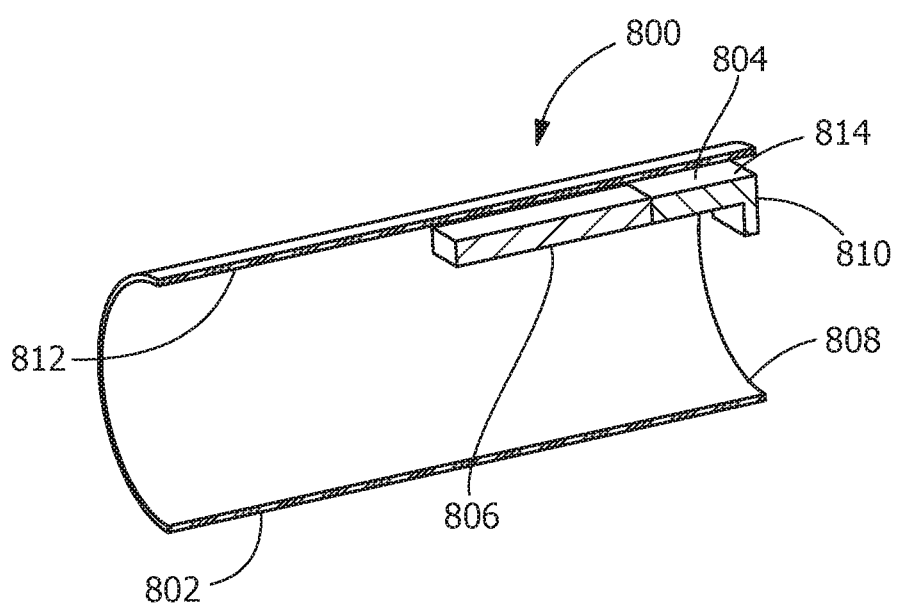
FIG. 22 is a perspective is a cross-sectional perspective view of the device of FIG. 21, shown prior to recovery of the heat shrinkable tubing components thereof.

With reference to FIGS. 21 through 22, another alternate exemplary embodiment of the invention is shown. Device 800 includes a piece of shrinkable tubing 802; a strip (e.g., a planar member, sleeve or other profiled geometry) of a first sealant/adhesive 804; and a strip (e.g., a planar member, sleeve or other profiled geometry) of a second sealant/adhesive 806. The shrinkable tubing 802 can be a single layer or multilayer tubing, as previously described. Also, as previously described, shrinkable tubing 802 is a polymeric component that shrinks on the application of heat. Such shrinkable tubing may include, but is not limited to, heat shrinkable tubing or tape. The term sealant/adhesive includes, but is not limited to, sealants and adhesives which are viscoelastic materials that have an ability to flow under suitable stimulus like temperature and/or pressure. Examples of such materials are hot melt adhesives and butyl mastics.

Figure 23:
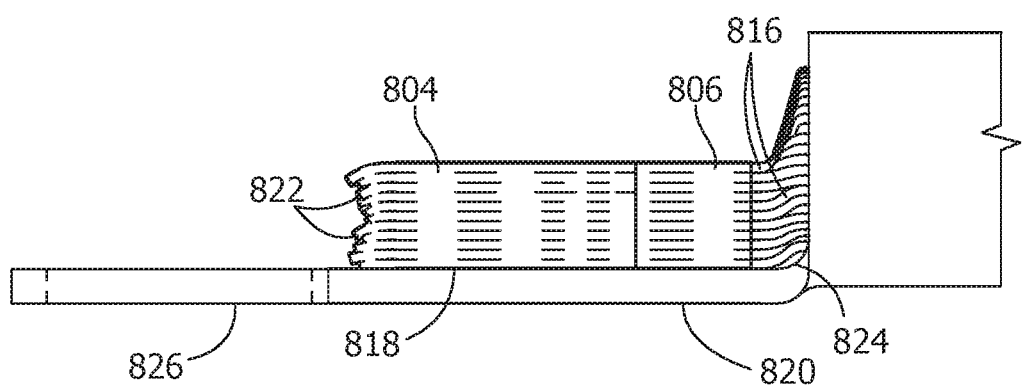
FIG. 23 is a diagrammatic side view a ring-type electrical terminal that includes a plurality of electrical wires attached to the wire attachment portion thereof, shown after the device of FIG. 21 has been recovered from a heating source, illustrating the distribution of adhesive between the electrical wires.

The first sealant/adhesive 804 and the second sealant/adhesive 806 are positioned on the shrinkable tubing 802 prior to the shrinkable tubing 802 being position on a terminal 820 (FIG. 23). However, in other embodiments, the components of device 800 are provided individually (as opposed to pre-assembled) and are assembled on the electrical terminal 820 and wire assembly just prior to creating the desired seal. For example, the first sealant/adhesive 804 and the second sealant/adhesive 806 may be separate members which are not part of the shrinkable tubing 802. Alternatively, the first sealant/adhesive 804 and the second sealant/adhesive 806 may be co-extruded.

The strip of the first sealant/adhesive 804 is placed within the shrinkable tubing 802 adjacent to or proximate an edge 808 of the shrinkable tubing 802. The first sealant/adhesive is a high viscosity sealant/adhesive. In one illustrative embodiment, the high-viscosity sealant/adhesive has a viscosity that is greater than 20 Pa·s at an installation temperature which correlates to a designated or rated temperature, as previously described. The strip of the second sealant/adhesive 806 is placed within the shrinkable tubing 802. The strip of the second sealant/adhesive 806 is spaced from the edge 808 and is adjacent to or spaced from the strip of the first sealant/adhesive 804. The spacing or distance between the strip of the first sealant/adhesive 804 and the strip of the second sealant/adhesive 806 is application dependent, depending upon, but not limited to the construction and size of the terminal. For example, the spacing or distance between the strip of the first sealant/adhesive 804 and the strip of the second sealant/adhesive 806 may range between 0 mm and 10 mm or between 0 mm and 50 mm. The second sealant/adhesive 806 is a low viscosity sealant/adhesive, as previously described.

The strip of the first sealant/adhesive 804 has a flow behavior such that it conforms to the surface of the wire attachment portion or surface of the plurality of wires without significantly flowing out of the desired region. This is achieved by using a sealant/adhesive in the strip of the first sealant/adhesive 804 which has a high inherent viscosity, or which could attain high viscosity by methods like cross-linking (where the cross-linking induces viscosity increase at a higher rate than an ooze out rate). The strip of the first sealant/adhesive 804 creates a barrier and prevent ooze out of the second sealant/adhesive. The strip of the second sealant/adhesive 806 has a low initial viscosity which allows it to displace air efficiently inside the substrate intended to be sealed. The strip of the second sealant/adhesive 806 creates a robust seal. The strip of the first sealant/adhesive 804 has a higher viscosity than the strip of the second sealant/adhesive 806 prior to installation.

In the embodiment shown in FIGS. 21 through 22, the strip of the first sealant/adhesive 804 has an L-shape, with a first portion 810 which extends further from an interior surface 812 of the tubing 802 than a second portion 814. As best shown in FIG. 23, the first portion 810 is dimensioned to interact with the wires in the weld area 818 of a terminal 820 where the wires 816 are mechanically and electrically attached to the terminal 820. The first portion 810 is positioned proximate to and interacts with the free ends 822 of the wires 816 to allow the first portion 810 to flow and properly seal the free ends 822 of the wires. The second portion 814 also interacts with the wires 816, in an area proximate to, but removed from, the free ends 822 to provide proper sealing of the wires 816.

As represented diagrammatically in FIG. 23, upon the application of heat (e.g., in an infrared oven for 30 seconds or other time period) after installation of the shrinkable tubing 802 over the electrical terminal 820, the strip of the first sealant/adhesive 804 is heated causing the first portion 810 to melt and flow across and proximate to the free ends 822 of the wires 816 and causing the second portion 814 to melt and flow across the plurality of wires 816 to form the barrier. The interaction of the first portion 810 with the wires in the weld area 818 provides a robust seal at the free ends 822 of the wires 816. The configuration of the first portion 810 and the second portion 814 of the first sealant/adhesive 804 allows the first sealant/adhesive 804 to accommodate geometry changes of the terminals, while still providing an effective seal to the free ends 822 of the wires 816.

The high viscosity of the first sealant/adhesive 804 allows for the adhesive flow of the first sealant/adhesive 804 to be controlled and constrained in an open geometry, such as at the free ends 822 of the wires 816. In addition, the controlled flow allows the first sealant/adhesive 804 to encapsulate the sharp free ends 822 of the individual wires 816.

In addition, the strip of the second sealant/adhesive 806 melts and flows across the plurality of wires 816 filling any present air voids. The shrinkable tubing 802 shrinks to encapsulate the plurality of electrical wires 816 and the wire attachment portion 824 of the electrical terminal 820, thereby substantially sealing the melted sealant/adhesive 804, 806 within the shrinkable tubing 802. During the heating process, the strip of the first sealant/adhesive 804 effectively constrains the flow of the second sealant/adhesive 806 in the direction of the terminal attachment portion 826, thereby reducing or preventing any problematic contamination of the terminal attachment portion 826. While in some instances a small amount of first sealant/adhesive 804 may travel onto the terminal attachment portion 826, the amount will be insignificant with regard to the functioning of the electrical terminal 820.

The configuration of the first sealant/adhesive 804 and the second sealant/adhesive 806 shown in FIGS. 21 through 23 are meant to be illustrative. In the embodiment shown, the first sealant/adhesive 804 has a width greater than the width of the second sealant/adhesive 806, and the second sealant/adhesive 806 has a length greater than the first sealant/adhesive 804. However, the widths and lengths of the first sealant/adhesive 804 and the second sealant/adhesive 806 may vary.

Figure 24:
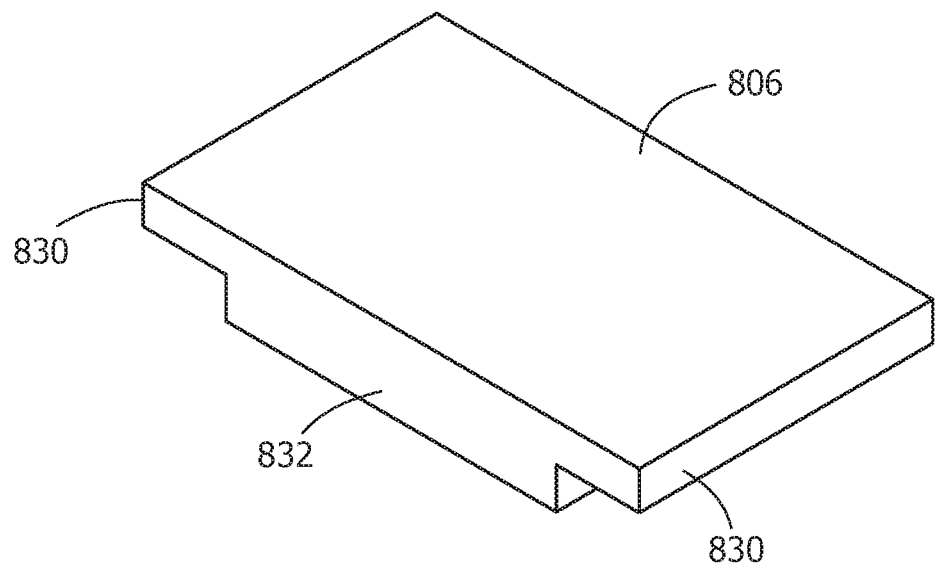
FIG. 24 is a perspective view of another exemplary embodiment of an adhesive strip which can be used to seal the electrical wires.

In the exemplary embodiment shown in FIGS. 21-23, the first sealant/adhesive 804 and the second sealant/adhesive 806 have a generally planar configuration. However, other cross-section profiles and geometries may be used. The configuration of the first sealant/adhesive 804 and/or the second sealant/adhesive 806 can be altered to allow different amounts of the first sealant/adhesive 804 and/or the second sealant/adhesive 806 can be altered to flow to different regions along the width of the terminal 820. For example, as shown in FIG. 24, the second sealant/adhesive 806 may have a T-cross section, with ends 830 which are thinner than body 832, to allow different amounts of the second sealant/adhesive 806 to flow to different regions along the width of the terminal 820. Other configurations of one or both of the first sealant/adhesive 804 and the second sealant/adhesive 806 can be used without departing from the scope of the invention.

The geometry of the first sealant/adhesive 804 and the second sealant/adhesive 806 allows for the controlled flow of the first sealant/adhesive 804 and the second sealant/adhesive 806. In so doing, the unwanted or excess flow of the first sealant/adhesive 804 and/or the second sealant/adhesive 806 to the back side of the terminal 820 can be controlled. In so doing, the flow of the first sealant/adhesive 804 and the second sealant/adhesive 806 that does not enter between the wires 816 is eliminated or greatly reduced, thereby preventing ooze out of the first sealant/adhesive 804 and/or the second sealant/adhesive 806.

Figure 25:
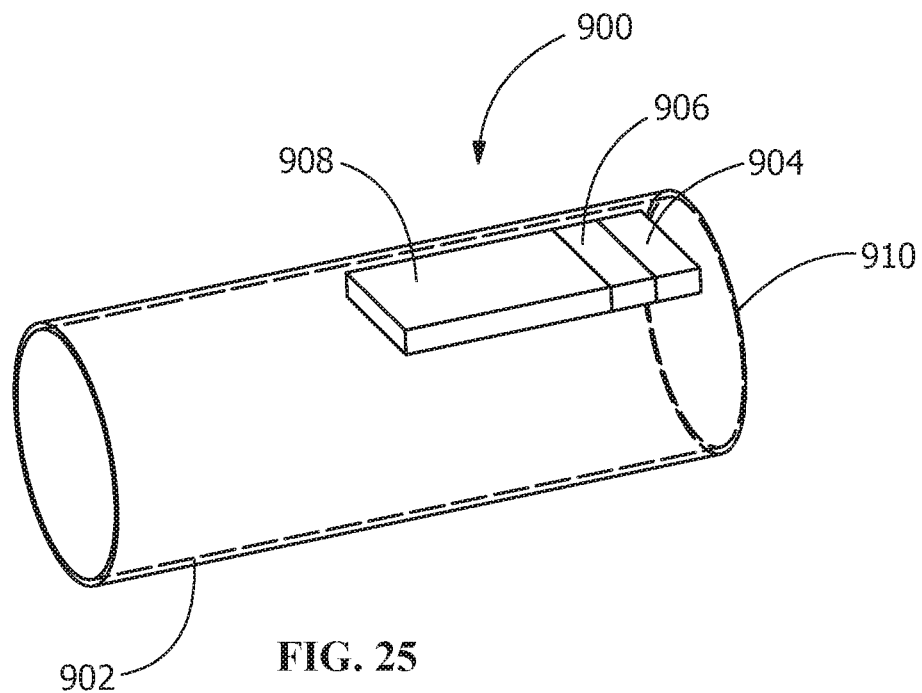
FIG. 25 is a perspective view of an alternate device for sealing an electrical terminal in accordance with an exemplary embodiment of the present invention, illustrating a heat shrinkable tubing with a high viscosity adhesive strip positioned between two low viscosity adhesive strips.
Figure 26:
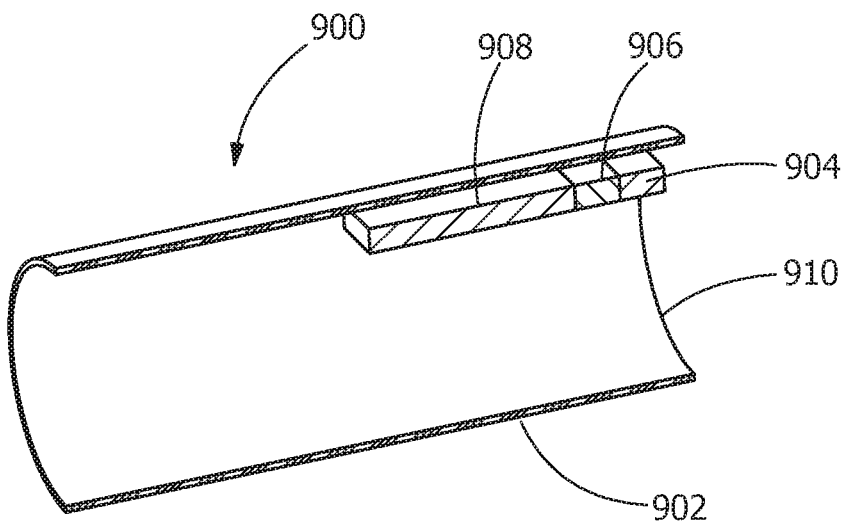
FIG. 26 is a perspective is a cross-sectional perspective view of the device of FIG. 25, shown prior to recovery of the heat shrinkable tubing components thereof.

With reference to FIGS. 25 and 26, another alternate exemplary embodiment of the invention is shown. Device 900 includes a piece of shrinkable tubing 902; a strip (e.g., a planar member, L-shape member or other profiled geometry) of a first sealant/adhesive 904; a strip (e.g., a planar member, strip or other profiled geometry) of a second sealant/adhesive 906; and a strip (e.g., a planar member, strip or other profiled geometry) of a third sealant/adhesive 908. The shrinkable tubing 902 is similar to that described with respect to FIGS. 21 through 23, as previously described. In the embodiment shown, the strip of the third sealant/adhesive 908 is the same or similar to the strip of the first sealant/adhesive 904. However, the strip of the third sealant/adhesive 908 and the strip of the first sealant/adhesive 904 may be made of different materials and have different viscosities. The term sealant/adhesive includes, but is not limited to, sealants and adhesives which are viscoelastic materials that have an ability to flow under suitable stimulus like temperature and/or pressure. Examples of such materials are hot melt adhesives and butyl mastics.

The first sealant/adhesive 904, the second sealant/adhesive 906 and the third sealant/adhesive 908 are positioned on the shrinkable tubing 902 prior to the shrinkable tubing 902 being position on a terminal. However, in other embodiments, the components of device 900 are provided individually (as opposed to pre-assembled) and are assembled on the electrical terminal and wire assembly just prior to creating the desired seal. For example, the first sealant/adhesive 904, the second sealant/adhesive 906 and the third sealant/adhesive 908 may be separate members which are not part of the shrinkable tubing 902. Alternatively, the first sealant/adhesive 904, the second sealant/adhesive 906 and the third sealant/adhesive 908 may be co-extruded.

The strip of the first sealant/adhesive 904 is placed within the shrinkable tubing 902 adjacent to or proximate an edge 910 of the shrinkable tubing 902. The first sealant/adhesive is a low viscosity sealant/adhesive. In one illustrative embodiment, the low-viscosity sealant/adhesive has a viscosity that is less than 20 Pa·s at an installation temperature which correlates to a designated or rated temperature, as previously described.

The strip of the second sealant/adhesive 906 is placed within the shrinkable tubing 902. The strip of the second sealant/adhesive 906 is spaced from the edge 910 and is adjacent to or spaced from the strip of the first sealant/adhesive 904. The spacing or distance between the strip of the first sealant/adhesive 904 and the strip of the second sealant/adhesive 906 is application dependent, depending upon, but not limited to the construction and size of the terminal. For example, the spacing or distance between the strip of the first sealant/adhesive 904 and the strip of the second sealant/adhesive 906 may range between 0 mm and 10 mm. The second sealant/adhesive 906 is a high viscosity sealant/adhesive. In one illustrative embodiment the high-viscosity sealant/adhesive has a viscosity that is greater than 20 Pa·s at an installation temperature which correlates to a designated or rated temperature, as previously described.

The strip of the third sealant/adhesive 908 is placed within the shrinkable tubing 902. The strip of the third sealant/adhesive 908 is spaced from the edge 910 and is adjacent to or spaced from the strip of the second sealant/adhesive 906. The spacing or distance between the strip of the third sealant/adhesive 908 and the strip of the second sealant/adhesive 906 is application dependent, depending upon, but not limited to the construction and size of the terminal. For example, the spacing or distance between the strip of the third sealant/adhesive 908 and the strip of the second sealant/adhesive 906 may range between 0 mm and 10 mm. The third sealant/adhesive 908 is a low viscosity sealant/adhesive. In one illustrative embodiment the low-viscosity sealant/adhesive 908 has a viscosity that is less than 20 Pa·s at an installation temperature which correlates to a designated or rated temperature, as previously described.

The strip of the second sealant/adhesive 906 has a flow behavior such that it conforms to the surface of the wire attachment portion or surface of the plurality of wires without significantly flowing out of the desired region. This is achieved by using a sealant/adhesive in the strip of the second sealant/adhesive 906 which has a high inherent viscosity, or which could attain high viscosity by methods like cross-linking (where the cross-linking induces viscosity increase at a higher rate than an ooze out rate). The strip of the second sealant/adhesive 906 creates a barrier and prevent ooze out of the third sealant/adhesive 908. The strip of the third sealant/adhesive 908 has a low initial viscosity which allows it to displace air efficiently inside the substrate intended to be sealed. The strip of the third sealant/adhesive 908 creates a robust seal. The strip of the second sealant/adhesive 906 has a higher viscosity than the strip of the third sealant/adhesive 908 prior to installation.

In the embodiment shown in FIGS. 25 and 26, the strip of the first sealant/adhesive 904 is dimensioned to interact with the wires in the weld area of a terminal where the wires are mechanically and electrically attached to the terminal. The first sealant/adhesive 904 is positioned proximate to and interacts with the free ends of the wires to allow the first sealant/adhesive 904 to flow and properly seal the free ends of the wires.

Upon the application of heat (e.g., in an infrared oven for 30 seconds or other time period) after installation of the shrinkable tubing 902 over the electrical terminal, the first sealant/adhesive 904 melts and flows across and proximate to the free ends of the wires. The interaction of the first sealant/adhesive 904 with the wires in the weld area provides a robust seal at the free ends of the wires.

As the first sealant/adhesive 904 is a small controlled strip, the adhesive flow of the first sealant/adhesive 904 is controlled and constrained in an open geometry, such as at the free ends of the wires. In addition, the controlled flow allows the first sealant/adhesive 904 to encapsulate the sharp free ends of the individual wires. While in some instances a small amount of first sealant/adhesive 904 may travel onto the terminal attachment portion of the terminal, the amount will be insignificant with regard to the functioning of the electrical terminal.

In addition, the strip of the second sealant/adhesive 904 melts and flows across the wire attachment portion or surface of the plurality of wires to form the barrier, and the strip of the third sealant/adhesive 908 melts and flows across the plurality of wires filling any present air voids. The shrinkable tubing 902 shrinks to encapsulate the plurality of electrical wires and the wire attachment portion of the electrical terminal, thereby substantially sealing the melted sealant/adhesive 904, 906, 908 within the shrinkable tubing 902. During the heating process, the strip of the second sealant/adhesive 906 effectively constrains the flow of the third sealant/adhesive 908 in the direction of the terminal attachment portion of the terminal, thereby reducing or preventing any problematic contamination of the terminal attachment portion.

The configuration of the first sealant/adhesive 904, the second sealant/adhesive 906 and the third sealant/adhesive 908 shown in FIGS. 25 and 26 are meant to be illustrative. For example, the widths and lengths of the first sealant/adhesive 904, the second sealant/adhesive 906 and the third sealant/adhesive 908 may vary.

In the exemplary embodiment shown in FIGS. 25 and 26, the first sealant/adhesive 904, the second sealant/adhesive 906 and the third sealant/adhesive 908 have a generally planar configuration. However, other cross-section profiles and geometries may be used. The configuration of the first sealant/adhesive 904, the second sealant/adhesive 906 and/or the third sealant/adhesive 908 can be altered to allow different amounts of the first sealant/adhesive 904, the second sealant/adhesive 906 and/or the third sealant/adhesive 908 to flow to different regions along the width of the terminal.

The geometry of the first sealant/adhesive 904, the second sealant/adhesive 906 and the third sealant/adhesive 908 allows for the controlled flow of the first sealant/adhesive 904, the second sealant/adhesive 906 and the third sealant/adhesive 908.

Figure 27:
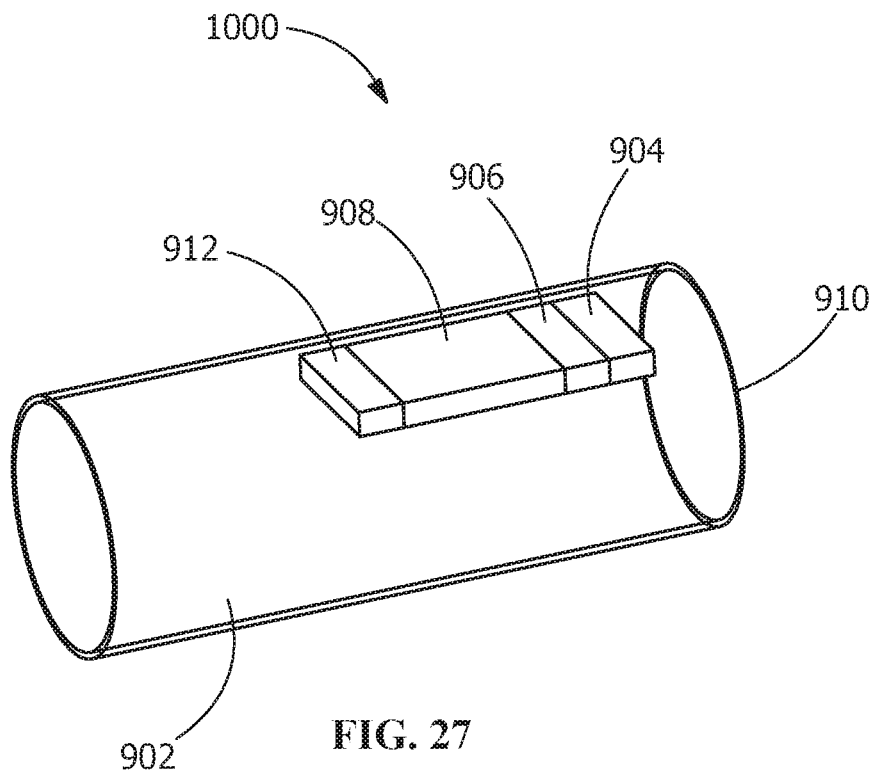
FIG. 27 is a perspective view of another exemplary embodiment of an adhesive strip which can be used to seal the electrical wires.

FIG. 27 is another alternate embodiment of the invention. In this embodiment, the device 1000 includes a shrinkable tubing 902, the strip of the first sealant/adhesive 904, the strip of the second sealant/adhesive 906, and the strip of the third sealant/adhesive 908, which are similar to that shown in and described with respect to FIGS. 25 and 26. In addition, a fourth strip (e.g., a planar member, strip or other profiled geometry) of a fourth sealant/adhesive 912 is provided.

The strip of the fourth sealant/adhesive 912 is placed within the shrinkable tubing 902. The strip of the fourth sealant/adhesive 912 is spaced from the edge 910 and is adjacent to or spaced from the strip of the third sealant/adhesive 908. The spacing or distance between the strip of the fourth sealant/adhesive 912 and the strip of the third sealant/adhesive 908 is application dependent, depending upon, but not limited to the construction and size of the terminal. The fourth sealant/adhesive 912 is a high viscosity sealant/adhesive. In one illustrative embodiment the high-viscosity sealant/adhesive has a viscosity that is greater than 20 Pa·s at an installation temperature which correlates to a designated or rated temperature, as previously described.

The strip of the fourth sealant/adhesive 912 has a flow behavior such that it conforms to the surface of the wire attachment portion or surface of the plurality of wires without significantly flowing out of the desired region. This is achieved by using a sealant/adhesive in the strip of the fourth sealant/adhesive 912 which has a high inherent viscosity, or which could attain high viscosity by methods like cross-linking (where the cross-linking induces viscosity increase at a higher rate than an ooze out rate). The strip of the fourth sealant/adhesive 912 creates a barrier and prevent ooze out of the third sealant/adhesive 908. The strip of the fourth sealant/adhesive 912 has a higher viscosity than the strip of the third sealant/adhesive 908 prior to installation.

Figure 28:
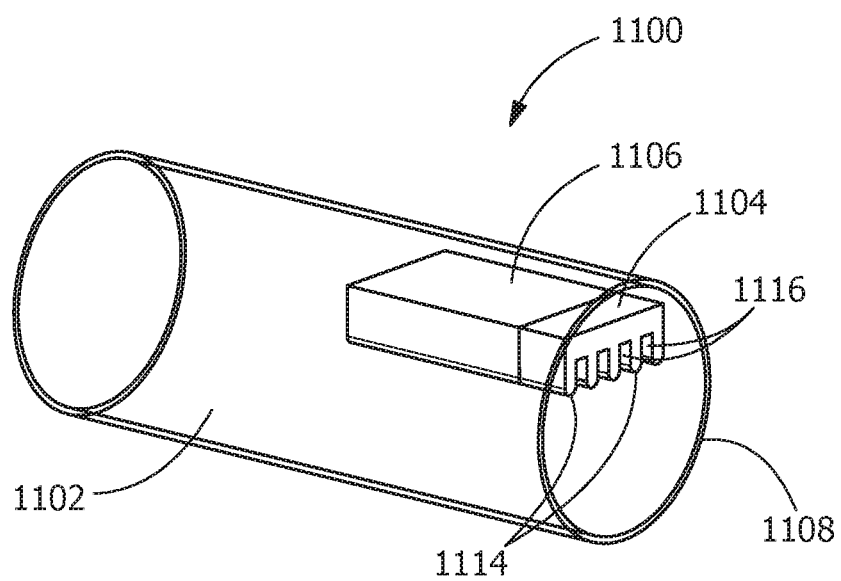
FIG. 28 is a perspective view of another exemplary embodiment of an adhesive strip which can be used to seal the electrical wires.

FIG. 28 is another alternate embodiment of the invention. In this embodiment, the device 1000 includes a piece of shrinkable tubing 1102; a strip (e.g., a planar member, L-shape member or other profiled geometry) of a first sealant/adhesive 1104; and a strip (e.g., a planar member, strip or other profiled geometry) of a second sealant/adhesive 1106. This embodiment is similar to the embodiment shown and described with respect to FIGS. 21-23. However, the first sealant/adhesive 1104 and/or the second sealant/adhesive 1106 have a dimensioned profile on the bottom surface to facilitate the flow of the sealant/adhesive between the wires. The first sealant/adhesive 1104 is a high viscosity sealant/adhesive and the second sealant/adhesive 1106 is a low viscosity sealant/adhesive, as previously described. In the embodiment shown, the bottom surface has projections 1114 spaced apart by recesses 1116, but other configurations can be used.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A system for sealing an electrical terminal, comprising:
   (a) a device for sealing a plurality of electrical wires to a wire attachment portion of an electrical terminal, wherein the device further includes:
      (i) a shrinkable tubing having a predetermined length, wherein the shrinkable tubing has been placed over the plurality of electrical wires such that one end thereof extends over the wire attachment portion of the electrical terminal;
      (ii) a sealant/adhesive, placed within the shrinkable tubing, the sealant/adhesive having a first portion proximate to an edge of the shrinkable tubing and a second portion connected to the first portion, the first portion extends further from an inside surface of the shrinkable tubing than the second portion;
      (iii) the sealant/adhesive having a strip of high viscosity sealant/adhesive proximate a strip of low viscosity sealant/adhesive;
   (b) wherein upon an application of heat to the device after installation of the device over the electrical terminal, the shrinkable tubing starts to recover, the first portion of the sealant/adhesive flows and seals free ends of the plurality of electrical wires.

2. The system of claim 1, wherein the strip of the high viscosity sealant/adhesive includes the first portion of the sealant/adhesive and the second portion.

3. The system of claim 1, wherein the strip of the low viscosity sealant/adhesive is a planar member.

4. The system of claim 1, wherein spacing between the strip of the high viscosity sealant/adhesive and the strip of the low viscosity sealant/adhesive is between 0 mm and 50 mm.

5. The system of claim 4, wherein spacing between the strip of the high viscosity sealant/adhesive and the strip of the low viscosity sealant/adhesive is between 0 mm and 10 mm.

6. The system of claim 1, wherein the strip of the high viscosity sealant/adhesive has an equal or greater width than the strip of the low viscosity sealant/adhesive.

7. The system of claim 1, wherein the strip of the low viscosity sealant/adhesive has a T-shaped cross-section, with ends of the strip of the low viscosity sealant/adhesive thinner than a body of the strip of the low viscosity sealant/adhesive.

8. The system of claim 1, wherein the shrinkable tubing is either single-walled tubing or double-walled tubing.

9. The system of claim 1, wherein the strip of high-viscosity sealant/adhesive has a viscosity that is greater than 20 Pa·s at an installation temperature.

10. The system of claim 1, wherein the strip of low-viscosity sealant/adhesive is a cross-linkable low-viscosity sealant/adhesive.

11. The system of claim 1, wherein the strip of high viscosity sealant/adhesive includes a hot melt thermoplastic sealant; a polyolefin copolymer-based sealant; a polyamide-based sealant; a thermoplastic elastomer-based sealant; a polyolefin and polyamide mixture-based sealant; a polyolefin and polyolefin copolymer mixture-based sealant; a polyolefin copolymer and polyamide mixture-based sealant; a fluoropolymer sealant, or combinations thereof.

12. The system of claim 1, wherein the strip of low viscosity sealant/adhesive includes a hot melt thermoplastic sealant; a polyolefin copolymer-based sealant; a polyamide-based sealant; a thermoplastic elastomer-based sealant; a polyolefin and polyamide mixture-based sealant; a polyolefin and polyolefin copolymer mixture-based sealant; a polyolefin copolymer and polyamide mixture-based sealant; a fluoropolymer sealant, or combinations thereof.

13. The system of claim 1, wherein the shrinkable tubing, the strip of high-viscosity sealant/adhesive and the strip of low-viscosity sealant/adhesive are assembled prior to placement of the device over the electrical terminal.

14. The system of claim 1, wherein the shrinkable tubing, the strip of high-viscosity sealant/adhesive and the strip of low-viscosity sealant/adhesive are assembled after placement of the device over the electrical terminal.

15. The system of claim 1, wherein the strip of low viscosity sealant/adhesive includes the first portion of the sealant/adhesive.

16. The system of claim 15, wherein the strip of high viscosity sealant/adhesive is adjacent to the first portion of the sealant/adhesive such that the strip of high viscosity sealant/adhesive is further away from the edge of the shrinkable tubing, an additional strip of low viscosity sealant/adhesive is positioned on the shrinkable tubing and is proximate to the strip of the high viscosity sealant/adhesive, wherein the strip of the high viscosity sealant/adhesive is positioned between the first portion and the additional strip of low viscosity sealant/adhesive.

17. A system for sealing an electrical terminal, comprising:
   (a) a device for sealing a plurality of electrical wires to a wire attachment portion of the electrical terminal, wherein the device further includes:
      (i) a first strip of low viscosity sealant/adhesive positioned proximate free ends of the plurality of electrical wires;
      (ii) a strip of high viscosity sealant/adhesive adjacent to the first strip of low viscosity sealant/adhesive;
      (iii) a second strip of low viscosity sealant/adhesive positioned proximate to the strip of the high viscosity sealant/adhesive, wherein the strip of the high viscosity sealant/adhesive is positioned between the first strip of low viscosity sealant/adhesive and the second strip of low viscosity sealant/adhesive;
      (iv) a shrinkable tubing having a predetermined length, wherein the shrinkable tubing has been placed over the first strip of low viscosity sealant/adhesive, the strip of high viscosity sealant/adhesive, the second strip of low viscosity sealant/adhesive and the plurality of electrical wires such that one end of the shrinkable tubing extends over the wire attachment portion of the electrical terminal;
   (b) wherein upon an application of heat to the device after installation of the device over the electrical terminal, the first strip of low viscosity sealant/adhesive flows and seals free ends of the plurality of electrical wires, the strip of high viscosity sealant/adhesive seals proximate the one end of the shrinkable tubing and the second strip of low-viscosity sealant/adhesive flows across and through the plurality of electrical wires creating a seal, wherein the strip of high viscosity sealant/adhesive prevents flow of the second strip of low-viscosity sealant/adhesive from contaminating the electrical terminal.

18. A system for sealing an electrical terminal, comprising:
(a) a device for sealing a plurality of electrical wires to a wire attachment portion of an electrical terminal, wherein the device further includes:
(i) a shrinkable tubing having a predetermined length, wherein the shrinkable tubing has been placed over the plurality of electrical wires such that one end thereof extends over the wire attachment portion of the electrical terminal;
(ii) a strip of high viscosity sealant/adhesive, placed within the shrinkable tubing, the strip of high viscosity sealant/adhesive having a first portion proximate to an edge of the shrinkable tubing, the strip of the high viscosity sealant/adhesive includes a second portion connected to the first portion, the first portion extends further from an inside surface of the shrinkable tubing than the second portion;
(iii) a strip of low viscosity sealant/adhesive placed within the shrinkable tubing and proximate to the strip of high viscosity sealant/adhesive such that the strip of low viscosity sealant/adhesive is further away from the edge of the shrinkable tubing;
(iv) spacing between the strip of the strip of high viscosity sealant/adhesive and the strip of low' viscosity sealant/adhesive is between 0 mm and 50 mm;
(b) wherein upon an application of heat to the device after installation of the device over the electrical terminal, the shrinkable tubing starts to recover, the strip of high viscosity sealant/adhesive seals the edge of the shrinkable tubing with the first portion cooperating with, free ends of the plurality of electrical wires to seal the free ends of the electrical wires and the strip of low-viscosity sealant/adhesive flows across and through the plurality of electrical wires creating a seal, wherein the strip of high viscosity sealant/adhesive prevents flow of the strip of low-viscosity sealant/adhesive from contaminating the electrical terminal.

19. The system of claim 18, wherein spacing between the strip of the high viscosity sealant/adhesive and the strip of the low viscosity sealant/adhesive is between 0 mm and 10 mm.

20. The system of claim 18, wherein the shrinkable tubing, the high-viscosity sealant/adhesive and the low-viscosity sealant/adhesive are assembled prior to placement of the device over the electrical terminal.

* * * * *